US010949482B2

(12) United States Patent
Popp et al.

(10) Patent No.: US 10,949,482 B2
(45) Date of Patent: *Mar. 16, 2021

(54) USER PROFILE BASED ON CLUSTERING TIERED DESCRIPTORS

(71) Applicant: GRACENOTE, INC., Emeryville, CA (US)

(72) Inventors: Phillip Popp, Oakland, CA (US); Ching-Wei Chen, Oakland, CA (US); Peter C. DiMaria, Berkeley, CA (US); Markus K. Cremer, Orinda, CA (US)

(73) Assignee: GRACENOTE, INC., Emeryville, CA (US)

( * ) Notice: Subject to any disclaimer, the term of this patent is extended or adjusted under 35 U.S.C. 154(b) by 150 days.

This patent is subject to a terminal disclaimer.

(21) Appl. No.: 16/161,887

(22) Filed: Oct. 16, 2018

(65) Prior Publication Data
US 2019/0050488 A1  Feb. 14, 2019

Related U.S. Application Data

(63) Continuation of application No. 13/611,740, filed on Sep. 12, 2012, now Pat. No. 10,140,372.

(51) Int. Cl.
G06F 16/9535 (2019.01)
G06F 16/68 (2019.01)
G06F 16/635 (2019.01)

(52) U.S. Cl.
CPC ........ *G06F 16/9535* (2019.01); *G06F 16/636* (2019.01); *G06F 16/68* (2019.01)

(58) Field of Classification Search
CPC ......... G06F 17/30749; G06F 17/30752; G06F 17/30761; G06F 17/3074; G06F 17/30699;

(Continued)

(56) References Cited

U.S. PATENT DOCUMENTS 5,616,876 A  4/1997 Cluts
5,754,939 A  5/1998 Herz et al.
(Continued)

FOREIGN PATENT DOCUMENTS

EP  3543872  9/2019
JP  2005078627  3/2005
(Continued)

OTHER PUBLICATIONS

European Patent Office, "European Search Report," issued in connection with European Patent Application No. 19174112.3, dated Jun. 14, 2019, 11 pages.

(Continued)

*Primary Examiner* — Jesse P Frumkin
(74) *Attorney, Agent, or Firm* — Hanley, Flight & Zimmerman, LLC

(57) ABSTRACT

Methods, apparatus, systems, and articles of manufacture are disclosed that involve a user profile based on clustering tiered descriptors. An example method includes grouping descriptors into a cluster of descriptors based on an association between the descriptors and each of a first item and a second item, accessing, via a user device, biometric data of a user, determining a first activity in which the user is engaged based on contextual data that correlates the cluster of descriptors with the biometric data of the user received from the user device via the network, generating a user profile based on the first activity of the user and the cluster of descriptors, and generating, in response to a second activity of the user matching the first activity associated with the cluster of descriptors within the user profile, a recommendation including a third item based on the user profile.

17 Claims, 16 Drawing Sheets

(58) Field of Classification Search
CPC .... G06F 16/9535; G06F 16/68; G06F 16/636; G06N 5/02; G06K 9/6219
See application file for complete search history.

(56) References Cited

U.S. PATENT DOCUMENTS

| | | | |
|---|---|---|---|
| 6,049,777 | A | 4/2000 | Sheena et al. |
| 6,411,724 | B1 | 6/2002 | Vaithilingam et al. |
| 6,912,505 | B2 | 6/2005 | Linden et al. |
| 7,075,000 | B2 | 7/2006 | Gang et al. |
| 7,081,579 | B2 | 7/2006 | Alcalde et al. |
| 7,102,067 | B2 | 9/2006 | Gang et al. |
| 7,133,924 | B1 | 11/2006 | Rosenberg et al. |
| 7,212,972 | B2 | 5/2007 | Sugano et al. |
| 7,312,391 | B2 | 12/2007 | Kaiser et al. |
| 7,469,283 | B2 | 12/2008 | Eyal et al. |
| 7,536,384 | B2 | 5/2009 | Venkataraman et al. |
| 7,603,360 | B2 | 10/2009 | Ramer et al. |
| 7,769,760 | B2 | 8/2010 | Watanabe et al. |
| 7,783,249 | B2 | 8/2010 | Robinson |
| 7,884,274 | B1 | 2/2011 | Wieder |
| 7,974,984 | B2 | 7/2011 | Reuther |
| 8,073,848 | B2 | 12/2011 | Aravamudan et al. |
| 8,352,483 | B1 | 1/2013 | Ramesh et al. |
| 8,452,725 | B2 | 5/2013 | Hatami-Hanza |
| 8,620,919 | B2 | 12/2013 | Gates et al. |
| 8,655,882 | B2 | 2/2014 | Kretz et al. |
| 8,930,204 | B1 | 1/2015 | Igoe et al. |
| 9,081,853 | B2 | 7/2015 | Rao et al. |
| 9,110,998 | B2 | 8/2015 | Li et al. |
| 9,665,616 | B2 | 5/2017 | Pickersgill et al. |
| 10,140,372 | B2 | 11/2018 | Popp et al. |
| 2002/0078029 | A1 | 6/2002 | Pachet |
| 2002/0147728 | A1 | 10/2002 | Goodman et al. |
| 2003/0028451 | A1 | 2/2003 | Ananian |
| 2003/0055516 | A1 | 3/2003 | Gang et al. |
| 2003/0229537 | A1 | 12/2003 | Dunning et al. |
| 2004/0073918 | A1 | 4/2004 | Ferman et al. |
| 2004/0073924 | A1 | 4/2004 | Pendakur |
| 2004/0254950 | A1 | 12/2004 | Musgrove et al. |
| 2005/0240580 | A1 | 10/2005 | Zamir et al. |
| 2006/0075013 | A1 | 4/2006 | Hite et al. |
| 2006/0156326 | A1 | 7/2006 | Goronzy et al. |
| 2006/0282339 | A1 | 12/2006 | Musgrove et al. |
| 2007/0157797 | A1 | 7/2007 | Hashizume et al. |
| 2007/0219996 | A1 | 9/2007 | Jarvinen |
| 2007/0271265 | A1 | 11/2007 | Acharya et al. |
| 2007/0271279 | A1 | 11/2007 | Acharya |
| 2007/0288478 | A1 | 12/2007 | DiMaria et al. |
| 2008/0021851 | A1 | 1/2008 | Alcalde et al. |
| 2009/0012947 | A1 | 1/2009 | Whitehead |
| 2009/0013260 | A1 | 1/2009 | Martin et al. |
| 2009/0037457 | A1 | 2/2009 | Musgrove |
| 2009/0063537 | A1 | 3/2009 | Bonnefoy-Cudraz et al. |
| 2009/0299945 | A1 | 12/2009 | Hangartner |
| 2009/0327243 | A1 | 12/2009 | Pradhan et al. |
| 2010/0005104 | A1 | 1/2010 | DiMaria et al. |
| 2010/0010968 | A1 | 1/2010 | Redlich et al. |
| 2010/0100826 | A1 | 4/2010 | Hawthorne et al. |
| 2010/0131443 | A1* | 5/2010 | Agarwal ............... H04L 67/32 706/46 |
| 2010/0153393 | A1 | 6/2010 | Wessling et al. |
| 2010/0185700 | A1 | 7/2010 | Bodain |
| 2010/0186577 | A1* | 7/2010 | Kim .................... G10H 1/0058 84/612 |
| 2010/0205222 | A1 | 8/2010 | Gajdos et al. |
| 2010/0223223 | A1 | 9/2010 | Sandler et al. |
| 2010/0268735 | A1 | 10/2010 | Planty et al. |
| 2010/0281025 | A1 | 11/2010 | Tsatsou et al. |
| 2010/0325135 | A1 | 12/2010 | Chen et al. |
| 2011/0040767 | A1 | 2/2011 | Kunjithapatham et al. |
| 2011/0060738 | A1 | 3/2011 | Gates et al. |
| 2011/0078158 | A1 | 3/2011 | Mukherjea et al. |
| 2011/0093361 | A1 | 4/2011 | Morales |
| 2011/0196851 | A1 | 8/2011 | Vadlamani et al. |
| 2012/0053829 | A1* | 3/2012 | Agarwal ............... G01C 21/20 701/418 |
| 2012/0059857 | A1 | 3/2012 | Jackson, Jr. |
| 2012/0095958 | A1 | 4/2012 | Pereira et al. |
| 2012/0110043 | A1 | 5/2012 | Cavet et al. |
| 2012/0173502 | A1 | 7/2012 | Kumar et al. |
| 2012/0203752 | A1 | 8/2012 | Ha-Thuc et al. |
| 2012/0226716 | A1 | 9/2012 | Yeh et al. |
| 2012/0233167 | A1 | 9/2012 | Gates et al. |
| 2012/0310973 | A1 | 12/2012 | Zhong et al. |
| 2012/0330974 | A1 | 12/2012 | Zillner |
| 2013/0080371 | A1 | 3/2013 | Harber et al. |
| 2013/0166605 | A1 | 6/2013 | Li et al. |
| 2013/0235040 | A1 | 9/2013 | Jackson, Jr. |
| 2013/0238710 | A1 | 9/2013 | Meshulam et al. |
| 2013/0297543 | A1 | 11/2013 | Treiser |
| 2014/0074650 | A1 | 3/2014 | Elias |
| 2014/0108395 | A1 | 4/2014 | Polonsky et al. |
| 2014/0114985 | A1 | 4/2014 | Mok et al. |
| 2015/0169746 | A1 | 6/2015 | Hatami-Hanza |

FOREIGN PATENT DOCUMENTS

| | | |
|---|---|---|
| JP | 2005338932 | 12/2005 |
| JP | 2009134484 | 6/2009 |
| WO | 2009036555 | 3/2009 |
| WO | 2012038007 | 3/2012 |
| WO | 2014042826 | 3/2014 |
| WO | 2006011102 | 6/2015 |

OTHER PUBLICATIONS

Korean Intellectual Property Office, "Notice of Preliminary Rejection," issued in connection with Korean Application No. 10-20105-7007737, dated Feb. 13, 2020, 9 pages. (English translation included).

Rho et al. "Implementing situation-aware and user-adaptive music recommendation service in semantic web and real-time multimedia computing environment." Multimedia tools and applications 65, No. 2 (2013): 259-282.

Rho et al. "COMUS: Ontological and rule-based reasoning for music recommendation system" In Advances in Knowledge Discovery and Data Mining, pp. 859-866. Springer Berlin Heidelberg, 2009.

Gangler, Thomas. "Metadaten und Merkmale zur Verwaltung von personlichen Musiksammlungen." (Sep. 10, 2009).

Dunker et al. "Content-Aware Auto-Soundtracks for Personal Photo Music Slideshows," In Multimedia and Expo (ICME), 2011 IEEE International Conference on, pp. 1-5. IEEE, 2011.

Cho et al. "A New Method for Ontology Merging Based on Concept Using Wordnet," In 2006 8th International Conference Advanced Communication Technology, vol. 3, pp. 1573-1576. IEEE, 2006.

Pogacnik, M., 2003. "User modeling based on TVAnytime metadata standard," (vol. 2, pp. 30-34). IEEE.

International Searching Authority, "International Search Report," issued in connection with International Application Serial No. PCT/US2013/055576, dated Mar. 10, 2014, 2 pages.

International Searching Authority, "Written Opinion," issued in connection with International Application Serial No. PCT/US2013/055576, dated Mar. 10, 2014, 6 pages.

International Searching Authority, "International Preliminary Report on Patentability," issued in connection with International Application Serial No. PCT/US2013/055576, dated Nov. 18, 2014, 34 pages.

International Searching Authority, "Article 34 Amendment filed Jul. 11, 2014 to Written Opinion," issued in connection with International Application Serial No. PCT/US2013/055576, dated Mar. 10, 2014, 5 pages.

De Mooij, A M, et al., "Learning Preferences for Music Playlists", (c) Koninklijke Philips Electronics N.V., (2003), 1-53.

Grimaldi, Marco, et al., "Experimenting with Music Taste Prediction by User Profiling", ACM Music Information Retrieval, (2004), pp. 173-180.

European Patent Office, "Extended European Search Report," in connection with European Application Serial No. 13838039.9, dated Apr. 5, 2016, 8 pages.

(56) References Cited

OTHER PUBLICATIONS

Geyer et al., "Proceedings of the 2nd ACM RecSys' 10 Workshop on Recommender Systems and the Social Web," Sep. 26, 2010, 77 pages.
De Gemmis et al., "Preference Learning in Recommender Systems", 2009, 15 pages.
Godoy et al., "User profiling in personal information agents: a survey", The Knowledge Engineering Review, vol. 00:0, Cambridge University Press, 2005, 33 pages.
Shepitsen et al., "Personalized Recommendation in Social Tagging Systems using Hierarchical Clustering", Research Gate, Jan. 2008, 9 pages.
Sahami et al., "SONIA: A Service for Organizing Networked Information Autonomously", Jun. 1998, 10 pages.
Kim et al., "Learning Implicit User Interest Hierarchy for Context in Personalization", Jan. 2003, 8 pages.
Crabtree et al., "Adaptive Personal Agents", Personal Technologies Journal, vol. 2, No. 3, 1998, 12 pages.
Hariri et al, "Personalized Text-Based Music Retrieval", Intelligent Techniques for Web Personalization and Recommendation: Papers from the AAAI 2013 Workshop, 2013, 7 pages.
Badarinza et al., "Clustering, Tiered Indexes and Term Proximity Weighting in Text-Based Retrieval" Studia Univ. Babe-Bolyai, Informatica, vol. LV, No. 1, 2010 (9 pages).
Kang et al., "Metadata Broadcasting for Personalized Service: A Practical Solution", ETRI Journal, vol. 26, No. 5, Oct. 2004, 15 pages.
Japanese Patent Office, "Notice of Reasons for Rejection," issued in connection with Japanese Application No. 2015531940, dated Aug. 25, 2017, 6 pages.
United States Patent and Trademark Office," Advisory Action", issued in connection with U.S. Appl. No. 13/611,740, dated Sep. 22, 2017, 3 pages.
United States Patent and Trademark Office, " Final Office Action", issued in connection with U.S. Appl. No. 13/611,740, dated Jul. 13, 2017, 22 pages.
United States Patent and Trademark Office, " Non-Final Office Action", issued in connection with U.S. Appl. No. 13/611,740, dated Oct. 19, 2017, 10 pages.
United States Patent and Trademark Office, " Notice of Allowance", issued in connection with U.S. Appl. No. 13/611,740, dated Jul. 16, 2018, 9 pages.
United States Patent and Trademark Office, "Supplemental Notice of Allowability", issued in connection with U.S. Appl. No. 13/611,740, dated Jul. 25, 2018, 6 pages.
European Patent Office, "Communication pursuant to Article 94(3) EPC", issued in connection with European Patent Application No. 13838039.9, dated Sep. 7, 2017, 9 pages.
European Patent Office, "Examination Report," issued in connection with European Patent Appiication No. 19174112.3, dated Apr. 23, 2020, 10 pages.
Korean Intellectual Property Office, "Notice of Preliminary Rejection," issued in connection with Korean Patent Application No. 10-2015-7007737 dated Nov. 26, 2020, 8 pages (English Translation Included).

* cited by examiner ered DESCRIPTORS

RELATED APPLICATIONS

This patent arises from a continuation of U.S. patent application Ser. No. 13/611,740, (Now U.S. Pat. No. 10,140,372) which was filed on Sep. 12, 2012. U.S. patent application Ser. No. 13/611,740 is hereby incorporated herein by reference in its entirety. Priority to U.S. patent application Ser. No. 13/611,740 is hereby claimed.

TECHNICAL FIELD

The subject matter disclosed herein generally relates to the processing of data. Specifically, the present disclosure addresses systems and methods that involve a user profile based on clustering tiered descriptors.

BACKGROUND

In modern information systems, a machine (e.g., a server machine) may manage a database in which one or more descriptors of an item are stored. An item may take the form of a good (e.g., a physical object), a service (e.g., performed by a service provider), information (e.g., digital media, such as an audio file, a video file, an image, or a document), a license (e.g., authorization to access something), or any suitable combination thereof. One or more descriptors that describe an item may be stored in the database managed by the machine.

The machine may form all or part of a network-based system that processes descriptors that describe one or more items. Examples of such network-based systems include commerce systems (e.g., shopping websites or auction websites), publication systems (e.g., classified advertisement websites), listing systems (e.g., wish list websites or gift registries), transaction systems (e.g., payment websites), and social network systems (e.g., Facebook®, Twitter®, or LinkedIn®).

BRIEF DESCRIPTION OF THE DRAWINGS

Some embodiments are illustrated by way of example and not limitation in the figures of the accompanying drawings.

DETAILED DESCRIPTION

Figure 1:
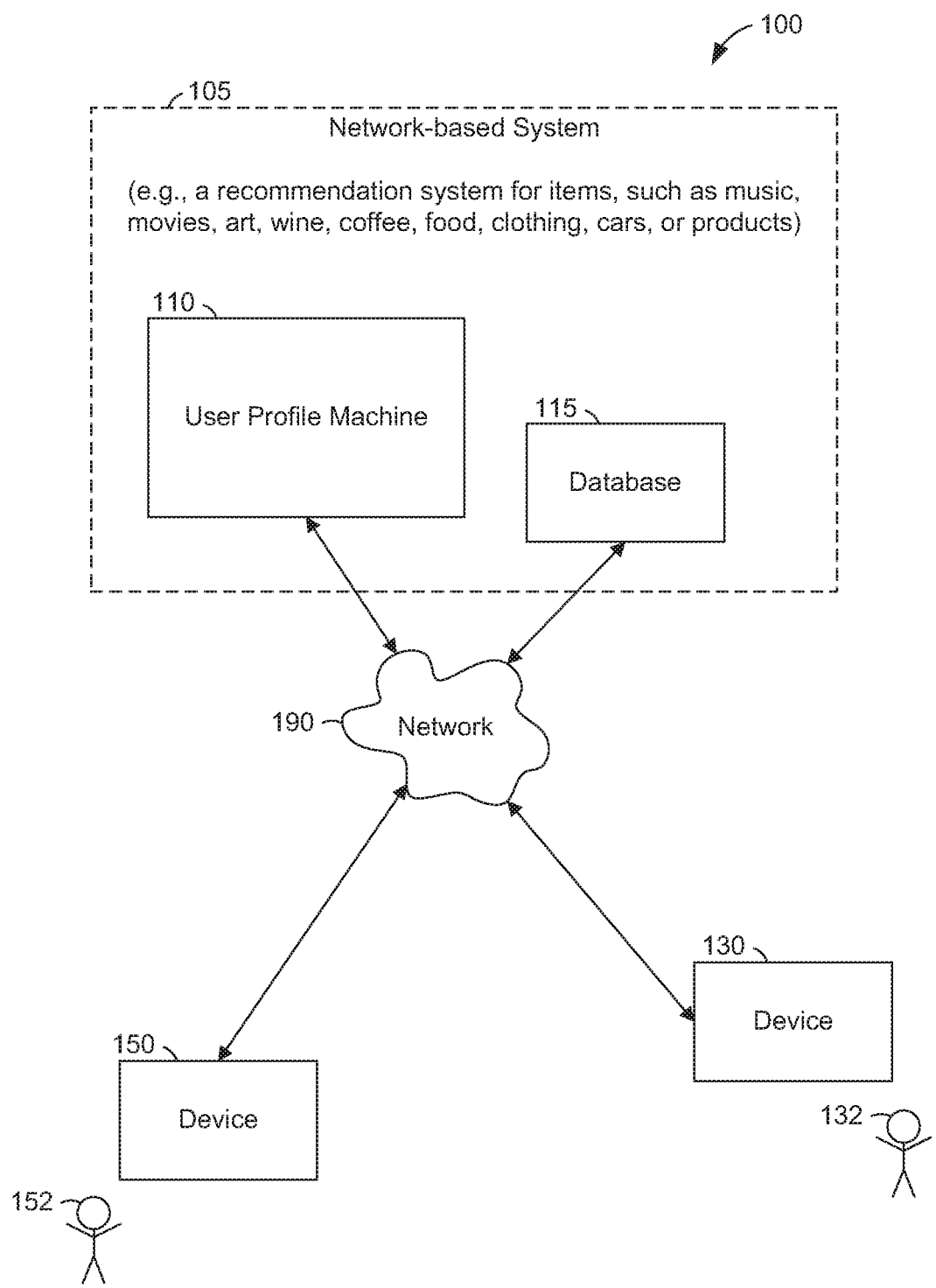
FIG. 1 is a network diagram illustrating a network environment suitable for generating a user profile based on clustering tiered descriptors, according to some example embodiments.

Example methods and systems are directed to a user profile based on one or more clusters of tiered descriptors. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A user of a network-based system may correspond to a user profile that describes the user. The user profile may describe the user. In particular, the user profile may describe the user with (e.g., by using) one or more descriptors of items that correspond to the user (e.g., items owned by the user, items liked by the user, or items rated by the user). In some situations, such a user profile may be characterized as a "taste profile" that describes an array or distribution of one or more tastes, preferences, or habits of the user. Accordingly, the user profile machine within the network-based system may generate the user profile by accessing descriptors of items that correspond to the user, clustering one or more of the descriptors, and generating the user profile based on one or more clusters of the descriptors.

According to various example embodiments, although the descriptors used in generating the user profile are descriptive of the items that correspond to the user, the generated user profile is descriptive of the user. For example, a particular descriptor (e.g., "jazz") of an item (e.g., a song) may be used as a cluster name for a cluster of descriptors, and the user profile machine may use this cluster name (e.g., "jazz") within the user profile (e.g., taste profile) that describes the user. This may have the effect of creating a user profile that describes the user, based on descriptors that describe items with which the user is associated. For example, the user profile may describe the user as having a taste or penchant for certain types of items (e.g., certain types of music, movies, art, wine, coffee, food, clothing, cars, or products).

According to certain example embodiments, the user profile machine may access contextual data of the user that indicates an activity in which the user is engaged (e.g., jogging or commuting). The user profile machine may determine the activity of the user and accordingly indicate that at least part of the user profile corresponds to the determined activity of the user. This may have the effect of creating a user profile that corresponds to the activity of the user. In some example embodiments, this may have the effect of creating multiple user profiles (e.g., taste profiles) that respectively correspond to multiple activities in which the user engages or performs. For example, a first user profile may describe the user when the user is engaged in jogging, while a second user profile may describe the user when the user is engaged in commuting.

FIG. 1 is a network diagram illustrating a network environment 100 suitable for generating a user profile based on clustering tiered descriptors, according to some example embodiments. The network environment includes a user profile machine 110, a database 115, and devices 130 and 150, all communicatively coupled to each other via a network 190. The user profile machine 110, the database 115, and the devices 130 and 150 may each be implemented in a computer system, in whole or in part, as described below with respect to FIG. 16.

As shown in FIG. 1, the user profile machine 110, the database 115, or both, may form all or part of a network-based system 105. According to various example embodiments, the network-based system 105 may be or include a recommendation system for items (e.g., music, movies, art, wine, coffee, food, clothing, cars, or products). For example, the network-based system 105 may provide a recommendation service to its users, and the recommendation service may be configured to provide recommendations, proposals, suggestions, or advertisements for items, based on a user's profile (e.g., as generated based on one or more clusters of tiered descriptors). As another example, the network-based system 105 may provide one or more services for personal channel creation (e.g., creation of personalized media channels from recommended streams of media), personalized creation of graphical user interfaces (GUIs) then include recommended elements, personalized creation of social network connections to recommended friends, or any suitable combination thereof.

Also shown in FIG. 1 are users 132 and 152. One or both of the users 132 and 152 may be a human user (e.g., a human being), a machine user (e.g., a computer configured by a software program to interact with the device 130), or any suitable combination thereof (e.g., a human assisted by a machine or a machine supervised by a human). In some example embodiments, a user is a representative of an organization or other entity (e.g., radio station, a magazine, a festival, a bookstore, or any suitable combination thereof). The user 132 is not part of the network environment 100, but is associated with the device 130 and may be a user of the device 130. For example, the device 130 may be a desktop computer, a vehicle computer, a tablet computer, a navigational device, a portable media device, or a smart phone belonging to the user 132. Likewise, the user 152 is not part of the network environment 100, but is associated with the device 150. As an example, the device 150 may be a desktop computer, a vehicle computer, a tablet computer, a navigational device, a portable media device, or a smart phone belonging to the user 152.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 16. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 190 may be any network that enables communication between or among machines, databases, and devices (e.g., the user profile machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof.

Figure 2:
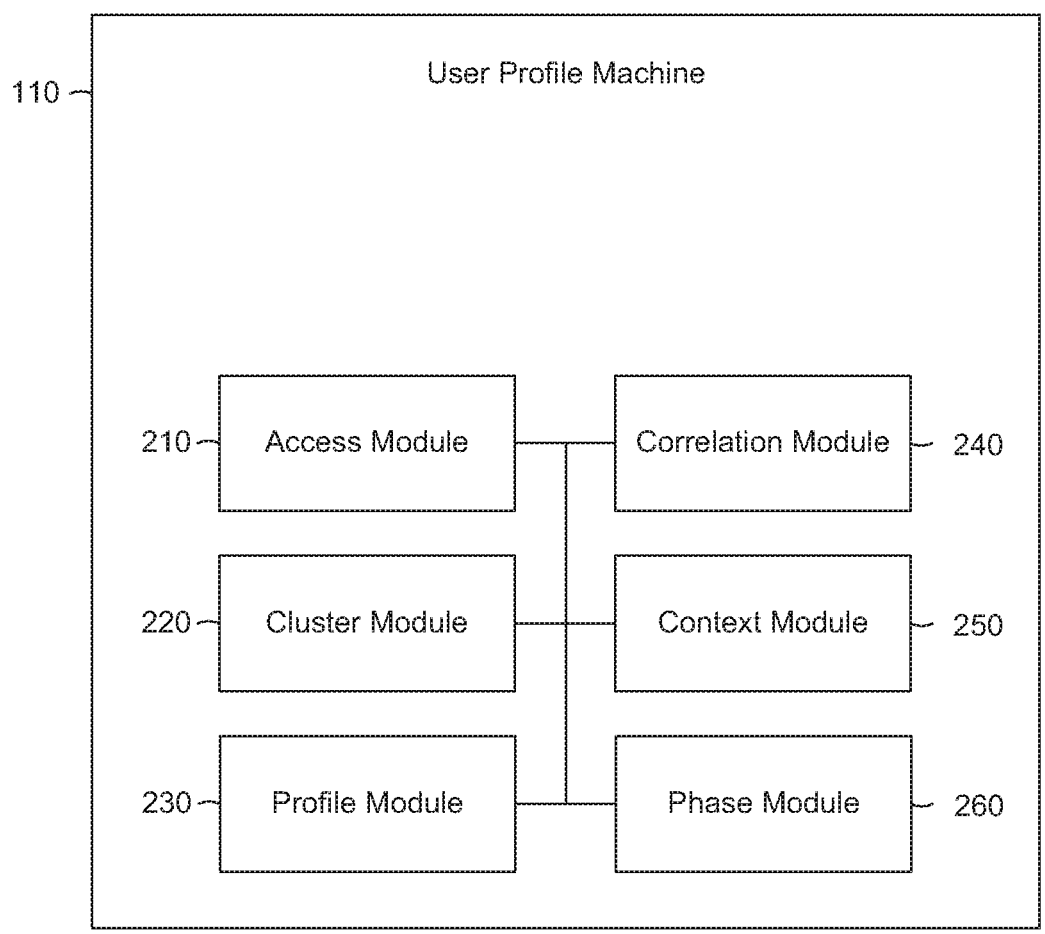
FIG. 2 is a block diagram illustrating components of a user profile machine within the network environment, according to some example embodiments.

FIG. 2 is a block diagram illustrating components of the user profile machine 110, according to some example embodiments. The user profile machine 110 includes an access module 210, a cluster module 220, and a profile module 230. According to various example embodiments, the user profile machine 110 may include a correlation module 240, a context module 250, and a phase module 260. The modules of the user profile machine 110 may be configured to communicate with each other (e.g., via a bus, shared memory, or a switch).

Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules.

Figure 3:
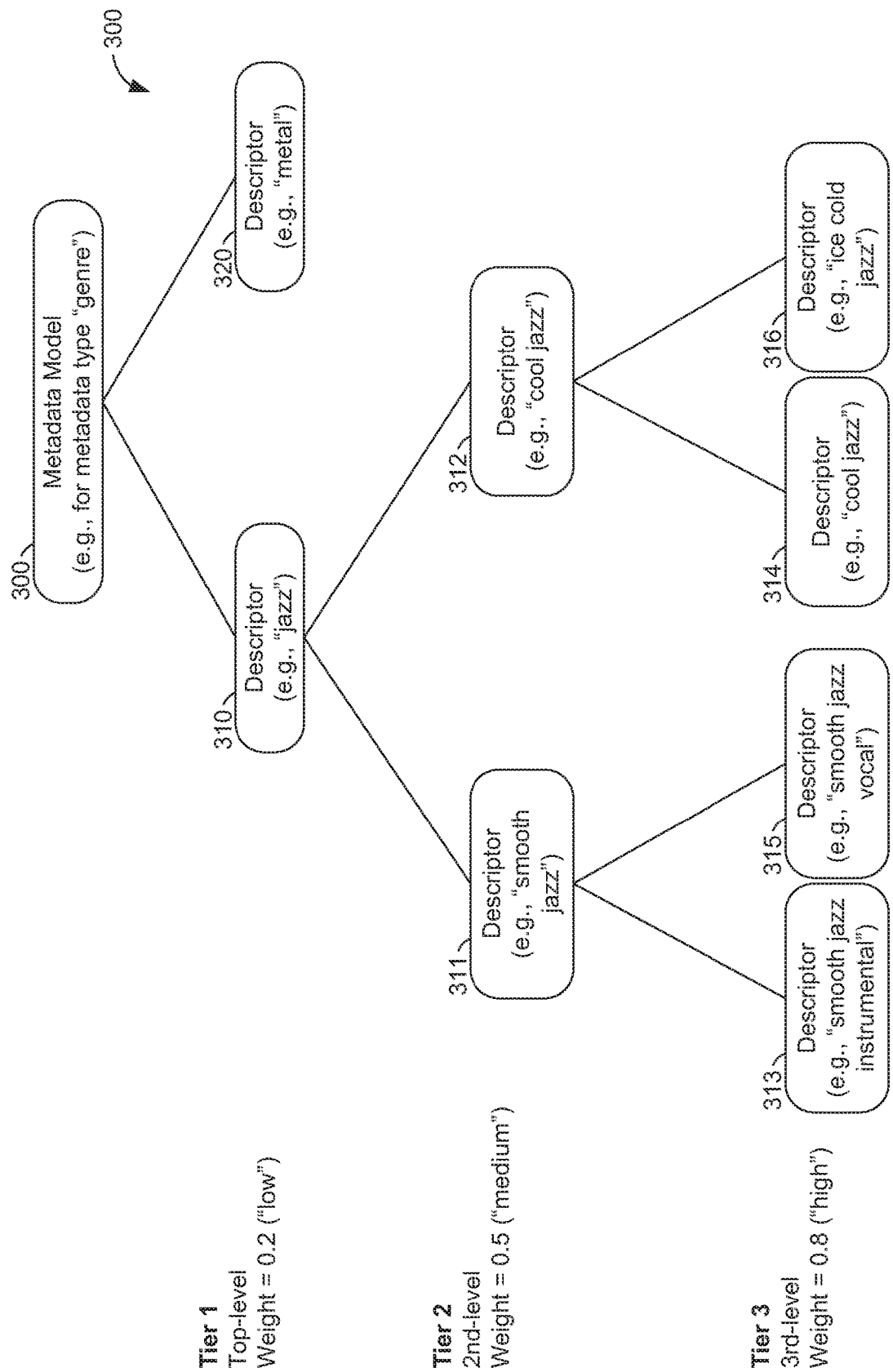
FIG. 3-4 are conceptual diagrams illustrating a metadata model that organizes descriptors into multiple tiers, according to some example embodiments.
Figure 4:
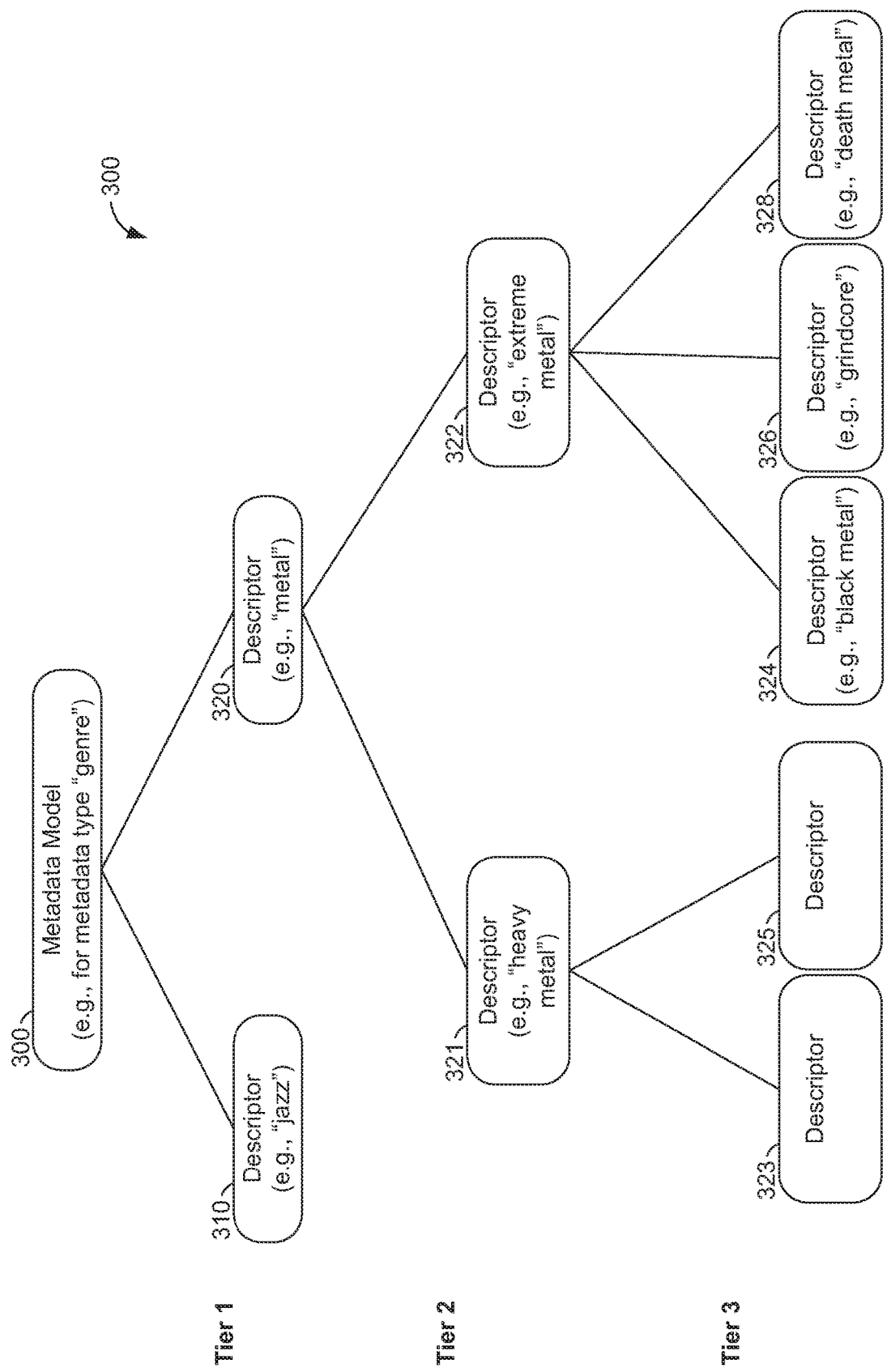

FIG. 3-4 are conceptual diagrams illustrating a metadata model 300 that organizes descriptors 310-328 into multiple tiers, according to some example embodiments. The metadata model 300 may correspond to a metadata type (e.g., "genre" or "mood"), and accordingly, the descriptors 310-328 organized by the metadata model 300 may likewise correspond to the same metadata type as the metadata model 300. In the example shown, the metadata model 300 and its descriptors 310-328 have the metadata type "genre." Hence, the metadata model 300 may organize descriptors that describe various genres of various items. The metadata model 300 may be stored in the database 115 and accessed by the user profile machine 110 therefrom. In some example embodiments, the metadata model 300 provides taxonomy for the metadata type.

The metadata model 300 includes the descriptors 310-328 and organizes the descriptors 310-328 into various tiers. FIG. 3-4 illustrates the metadata model 300 as including the descriptors 310-328 and organizing the descriptors 310-328 as a hierarchy of nodes that are organized into the multiple tiers of the metadata model 300. For example, the metadata model 300 has a top-level tier labeled as "Tier 1," and this top-level tier includes the descriptor 310 (e.g., "jazz") and the descriptor 320 (e.g., "metal"). The descriptors 310 and 320 are shown as child nodes of a root node that represents the entirety of the metadata model 300 (e.g., a hierarchy of descriptors for "genre"). Also, the top-level tier of the metadata model 300 may have a corresponding weight (e.g., a coefficient) that indicates its degree of influence relative to other tiers of the metadata model 300. As shown in FIG. 3, an example of such a weight for the top-level tier is 0.2 (e.g., "low"). According to various example embodiments, the weight of the top-level tier may be higher or lower than the weight of another tier.

As shown in FIG. 3-4, the metadata model 300 may have a second-level tier (e.g., a mid-level tier or an intermediate-level tier) labeled as "Tier 2," and this second-level tier may include the descriptor 311 (e.g., "smooth jazz"), the descriptor 312 (e.g., "cool jazz"), the descriptor 321 (e.g., "heavy metal"), and the descriptor 322 (e.g., "extreme metal"). The descriptors 311 and 312 are shown as child nodes of the descriptor 310 (e.g., "jazz"), and the descriptors 321 and 322 are shown as child nodes of the descriptor 320 (e.g., "metal"). Also, the second-level tier of the metadata model 300 may have a corresponding weight. As shown in FIG. 3, an example of such a weight for the second-level tier is 0.5 (e.g., "medium"). According to various example embodiments, the weight of the second-level tier may be higher or lower than the weight of another tier.

As further shown in FIG. 3-4, the metadata model 300 may have a third-level tier (e.g., a bottom-level tier) labeled as "Tier 3," and this third-level tier may include the descriptor 313 (e.g., "smooth jazz instrumental"), the descriptor 315 (e.g., "smooth jazz vocal"), the descriptor 314 (e.g., "cool jazz"), the descriptor 316 (e.g., "ice cold jazz"), the descriptor 323 (e.g., a subcategory of "heavy-metal," such as "nu-metal"), the descriptor 325 (e.g., another subcategory of "heavy-metal," such as "industrial metal"), the descriptor 324 (e.g., "black metal"), the descriptor 326 (e.g., "grindcore"), and the descriptor 328 (e.g., "death metal"). The descriptors 313 and 315 are shown as child nodes of the descriptor 311 (e.g., "smooth jazz"). The descriptors 314 and 316 are shown as child nodes of the descriptor 312 (e.g., "cool jazz"). The descriptors 323 and 325 are shown as child nodes of the descriptor 321, and the descriptors 324-328 are shown as child nodes of the descriptor 322 (e.g., "extreme metal"). Also, the third-level tier of the metadata model 300 may have a corresponding weight. As shown in FIG. 3, an example of such a weight for the third-level tier is 0.8 (e.g., "high"). According to various example embodiments, the weight of the third-level tier may be higher or lower than the weight of another tier. In some example embodiments, the metadata model 300 may have any number of tiers (e.g., seven, 50, or 10,000).

Figure 5:
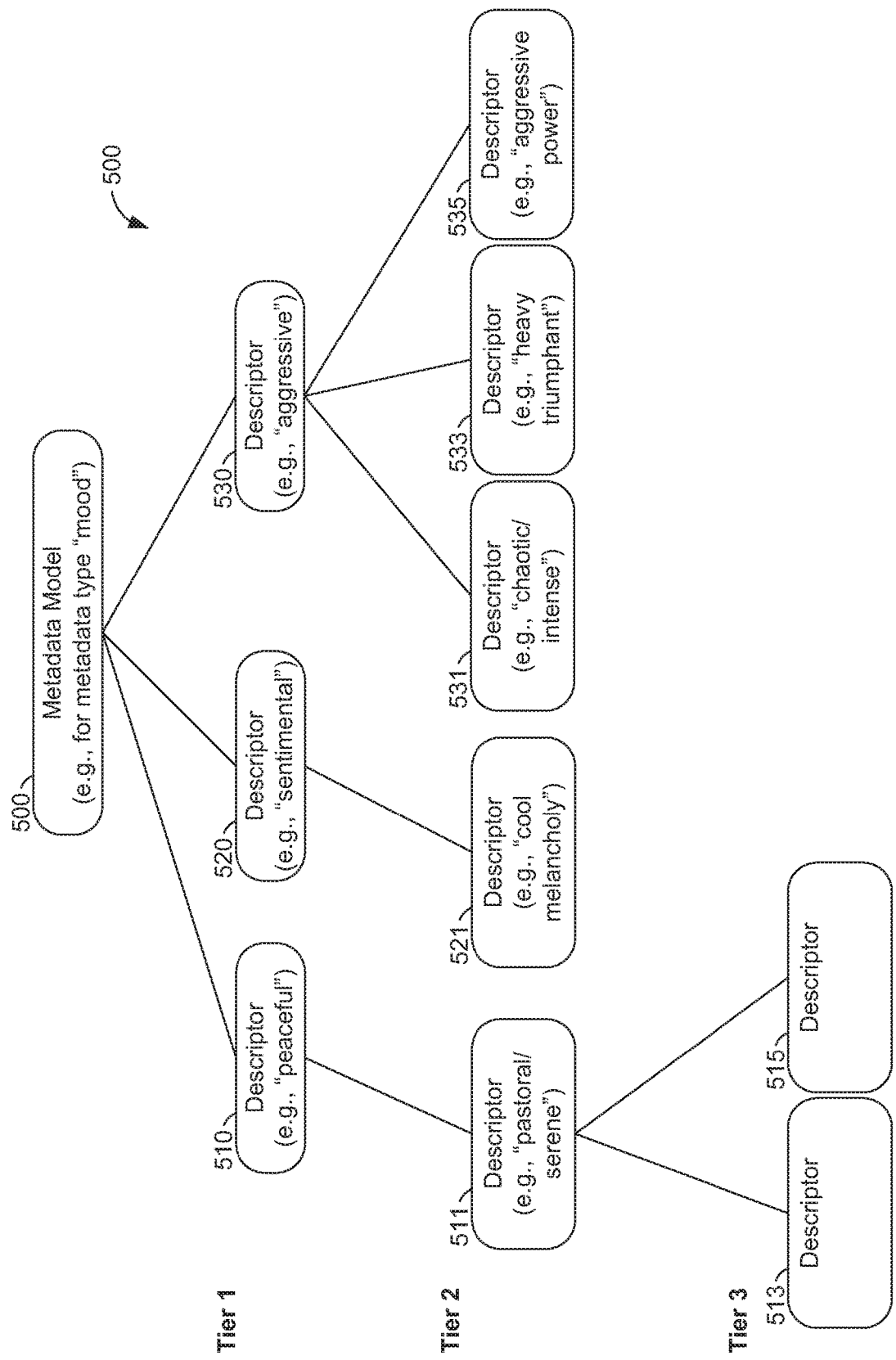
FIG. 5 is a conceptual diagram illustrating another metadata model that organizes descriptors into multiple tiers, according to some example embodiments.

FIG. 5 is a conceptual diagram illustrating another metadata model 500 that organizes descriptors 510-535 into multiple tiers, according to some example embodiments. The metadata model 500 may correspond to a metadata type (e.g., a different metadata type compared to the metadata model 300). Accordingly, the descriptors 510-535 organized by the metadata model 500 may similarly correspond to the same metadata type as the metadata model 500. In the example shown, the metadata model 500 and its descriptors 510-535 have the metadata type "mood." Hence, the metadata model 500 may organize descriptors that describe the various moods of various items. The metadata model 500 may be stored in the database 115 and accessed by the user profile machine 110 therefrom. In some example embodiments, the metadata model 500 provides taxonomy for the metadata type.

According to various example embodiments, other examples of metadata types include "origin," "era," "tempo," and "artist type," which may be applicable to items that are audio files (e.g., songs). Examples of metadata types for items that are video files (e.g., movies or television programs) include "genre," "mood," "era," "setting—time period," "region," "setting—location," "scenario," "style," and "topic." Examples of metadata types for items that are wines include "wine type," "region," "flavor notes," and "price range." Examples of metadata types for items that are coffees include "variety," "region," "flavor notes," and "price." Examples of metadata types for items that are foods include "region," "macronutrients," "complexity," "flavors," and "cost." Examples of metadata types for items that are clothing articles include "style," "era," "culture," "color," "cut," "fit," and "cost." Examples of metadata types for items that are cars include "type," "engine," "transmission," "region," "price range," and "color." In general, a metadata model (e.g., metadata model 300 or metadata model 500) is a data structure that represents an arrangement (e.g., a hierarchy or a heterarchy) of descriptors, and the metadata model may organize the arrangement of descriptors into multiple tiers (e.g., levels) of descriptors.

The metadata model 500 includes the descriptors 510-535 and organizes the descriptors 510-535 into various tiers. FIG. 5 illustrates the metadata model 500 as including the descriptors 510-535 and organizing the descriptors 510-535 as a hierarchy of nodes that are organized into the multiple tiers of the metadata model 500. For example, the metadata model 500 has a top-level tier labeled as "Tier 1," and this top-level tier includes the descriptor 510 (e.g., "peaceful"), the descriptor 520 (e.g., "sentimental"), and the descriptor 530 (e.g., "aggressive"). The descriptors 510, 520, and 530 are shown as child nodes of a root node that represents the entirety of the metadata model 500 (e.g., a hierarchy of descriptors for "mood"). Also, the top-level tier of the metadata model 500 may have a corresponding weight that indicates its degree of influence in relation to other tiers of the metadata model 500.

As shown in FIG. 5, the metadata model 500 may have a second-level tier labeled as "Tier 2," and the second-level tier may include the descriptor 511 (e.g., "pastoral/serene"), the descriptor 521 (e.g., "cool melancholy"), the descriptor 531 (e.g., "chaotic/intense"), the descriptor 533 (e.g., "heavy triumphant"), and the descriptor 535 (e.g., "aggressive power"). The descriptor 511 is shown as a child node of the descriptor 510 (e.g., "peaceful"). The descriptor 521 is shown as a child node of the descriptor 520 (e.g., "sentimental"). The descriptors 531, 533, and 535 are shown as child nodes of the descriptor 530 (e.g., "aggressive"). Also, the second-level tier of the metadata model 500 may have corresponding weight indicative of its influence relative to other tiers of the metadata model 500.

As further shown in FIG. 5, the metadata model 500 may have a third-level tier labeled as "Tier 3," and this third-level tier may include the descriptor 513 (e.g., a subcategory of "pastoral/serene") and the descriptor 515 (e.g., another subcategory of "pastoral/serene"). The descriptors 513 and 515 are shown as child nodes of the descriptor 511 (e.g., "pastoral/serene"). Also, the third-level tier of the metadata model 500 may have a corresponding weight that defines its influence compared to other tiers of the metadata model 500. In some example embodiments, the metadata model 500 may have any number of tiers (e.g., five, 70, or 25,000).

Figure 6:
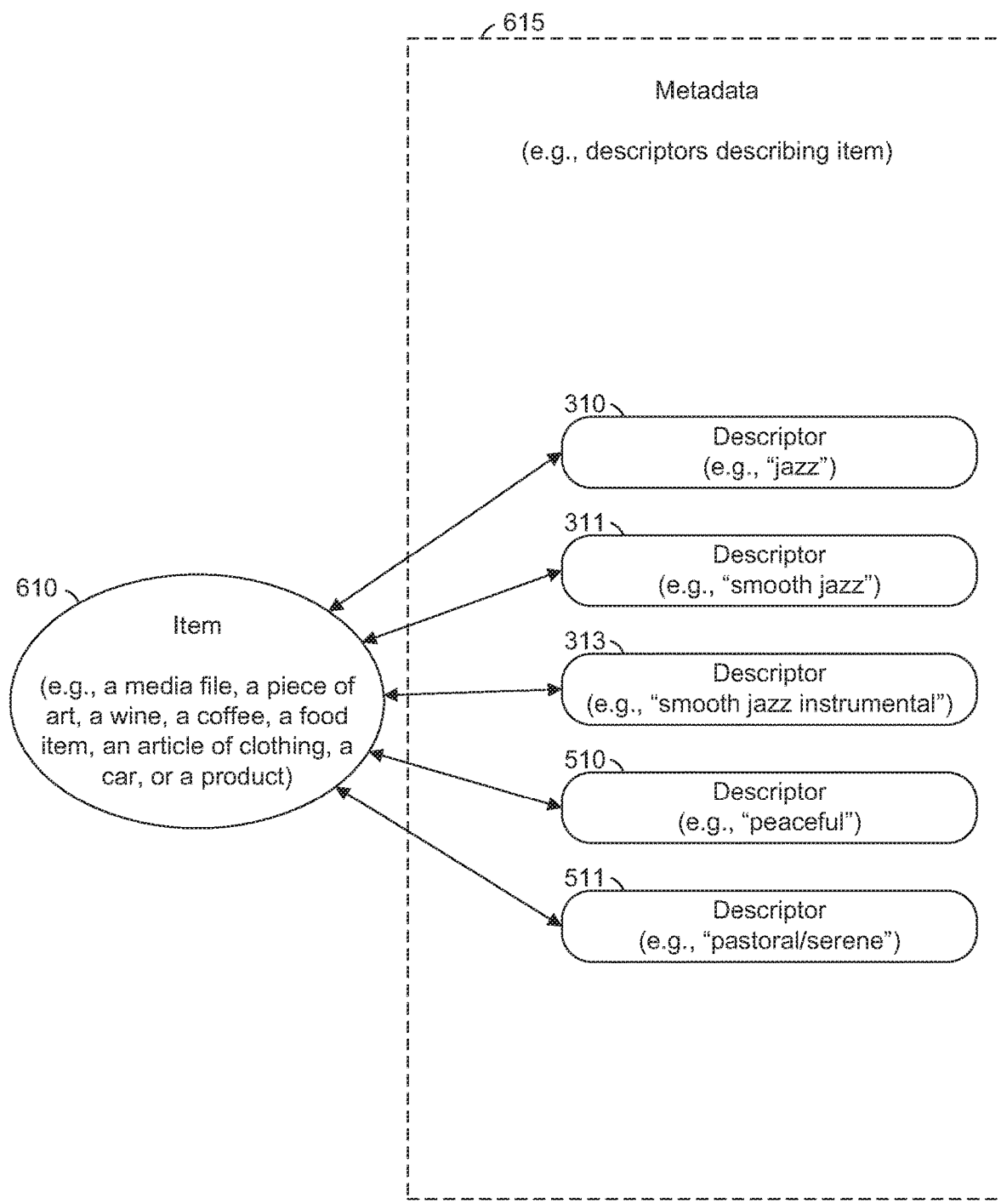
FIG. 6 is a conceptual diagram illustrating tiered descriptors of an item being included in metadata of the item, according to some example embodiments.

FIG. 6 is a conceptual diagram illustrating the descriptors 310, 311, 313, 510, and 511 being associated with (e.g., corresponding to) an item 610 and being included in metadata 615 of the item 610, according to some example embodiments. As shown, the item 610 is described by the descriptors 310, 311, 313, 510, and 511. Accordingly, the descriptors 310, 311, 313, 510, and 511 correspond to the item 610 and are included in the metadata 615. The metadata 615 corresponds to the item 610 and describes the item 610 (e.g., using the descriptors 310, 311, 313, 510, and 511 contained in the metadata 615). The metadata 615 may have one or more metadata types that correspond to one or more metadata types of the descriptors contained in the metadata 615.

According to various example embodiments, the item 610 may be a media file (e.g., an audio file, a video file, a slideshow presentation, an image, a document, or any suitable combination thereof). In certain example embodiments, the item 610 may be a piece of art (e.g., work of art), a wine (e.g., a particular batch of wine or a particular vintage from a particular vineyard), a coffee (e.g., a particular roast of coffee, a particular coffee bean varietal, or a particular shipment of coffee), a food item (e.g., a food product), an article of clothing (e.g., a particular clothing product), a car (e.g., a particular make and model of automobile), or some other consumer or commercial product.

Figure 7:
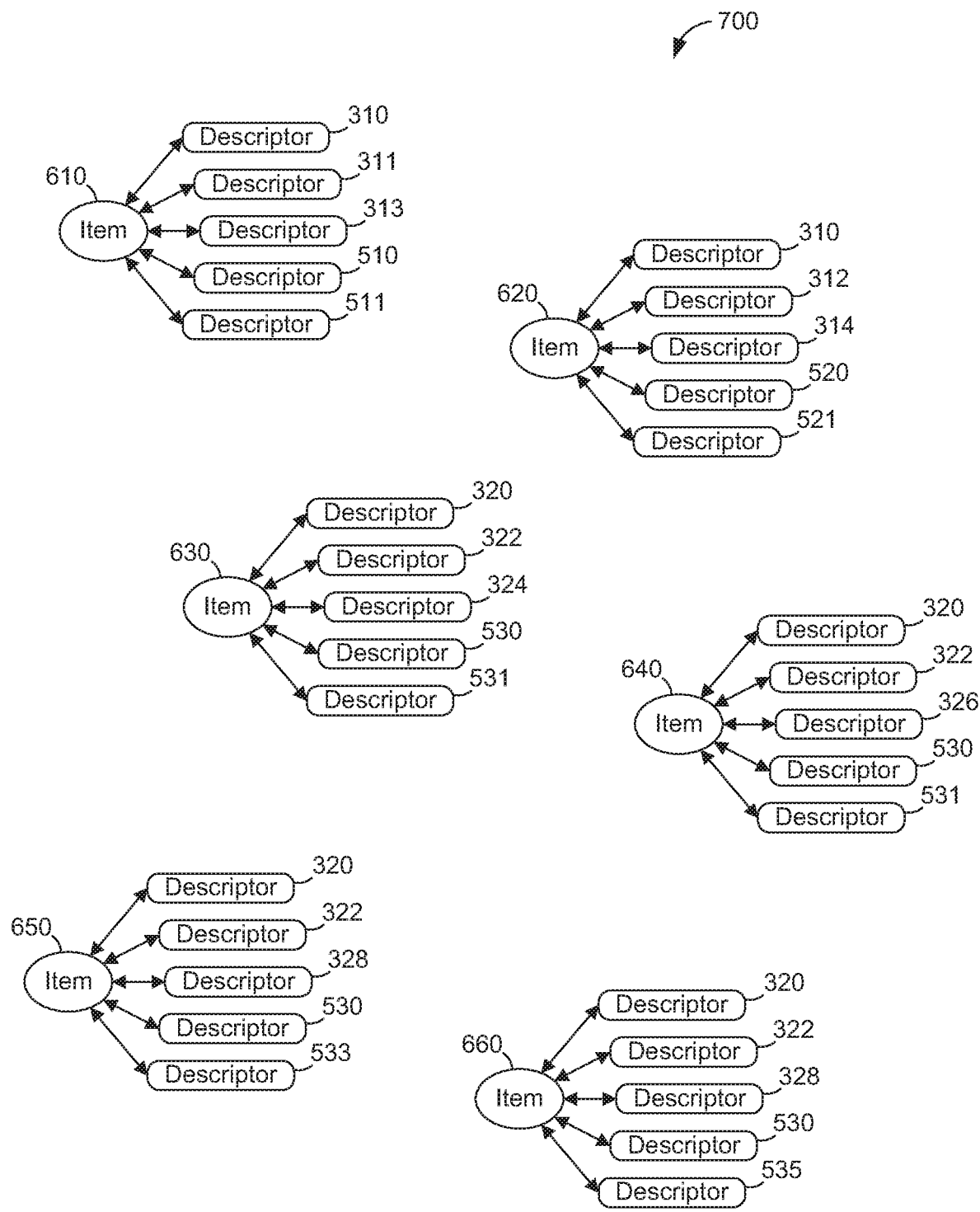
FIG. 7 is a conceptual diagram illustrating tiered descriptors that correspond to items, according to some example embodiments.

FIG. 7 is a conceptual diagram illustrating various tiered descriptors (e.g., descriptors 310, 311, 312, 313, 314, 320, 322, 324, 326, 328, 510, 511, 520, 521, 530, 531, 533, and 535) that correspond to various items (e.g., items 610, 620, 630, 640, 650, and 660), according to some example embodiments. As noted above with respect to FIG. 6, the item 610 is described by the descriptors 310, 311, 313, 510, and 511, which may be included in the metadata 615 of the item 610.

As shown in FIG. 7, the item 620 may be described by the descriptors 310, 312, 314, 520, and 521, which may be included in metadata of the item 620. Similarly, the item 630 may be described by the descriptors 320, 322, 324, 530, and 531, which may be included in metadata of the item 630. Likewise, the item 640 may be described by the descriptors 320, 322, 326, 530, and 531, which may be included in metadata of the item 640. Moreover, item 650 may be described by the descriptors 320, 322, 328, 530, and 533, which may be included in metadata of the item 650. Furthermore, the item 660 may be described by the descriptor 320, 322, 328, 530, and 535, which may be included in metadata of the item 660.

One or more of the items 610-650 may be included in a collection 700 of items that correspond to (e.g., belong to, reviewed by, purchased by, rated by, "liked" by, or any suitable combination thereof) a user for whom the user profile machine 110 may generate a user profile. Accordingly, one or more of the items 610-650 may be specimens of the collection 700 of items. For example, the collection 700 may be a media library of the user 132, and the items 610-660 may be media files within the media library of the user 132. As used herein, a "media library" of a user refers to a collection of media that corresponds to that user (e.g., a set of media files owned and stored by the user, a set of media files owned by the user and stored elsewhere, a set of media files to which the user has obtained access, a set of media streams to which the user has access, or any suitable combination thereof).

In generating a user profile (e.g., for the user 132), the user profile machine 110 may access data that represents the collection 700 of items. For example, such data may be stored in the database 115, and the user profile machine 110 (e.g., via the access module 210) may access the data from the database 115. Hence, the user profile machine 110 may access one or more of the descriptors 310-535 that describe one or more of the items 610-660 that are specimens (e.g., members) of the collection 700.

Figure 8:
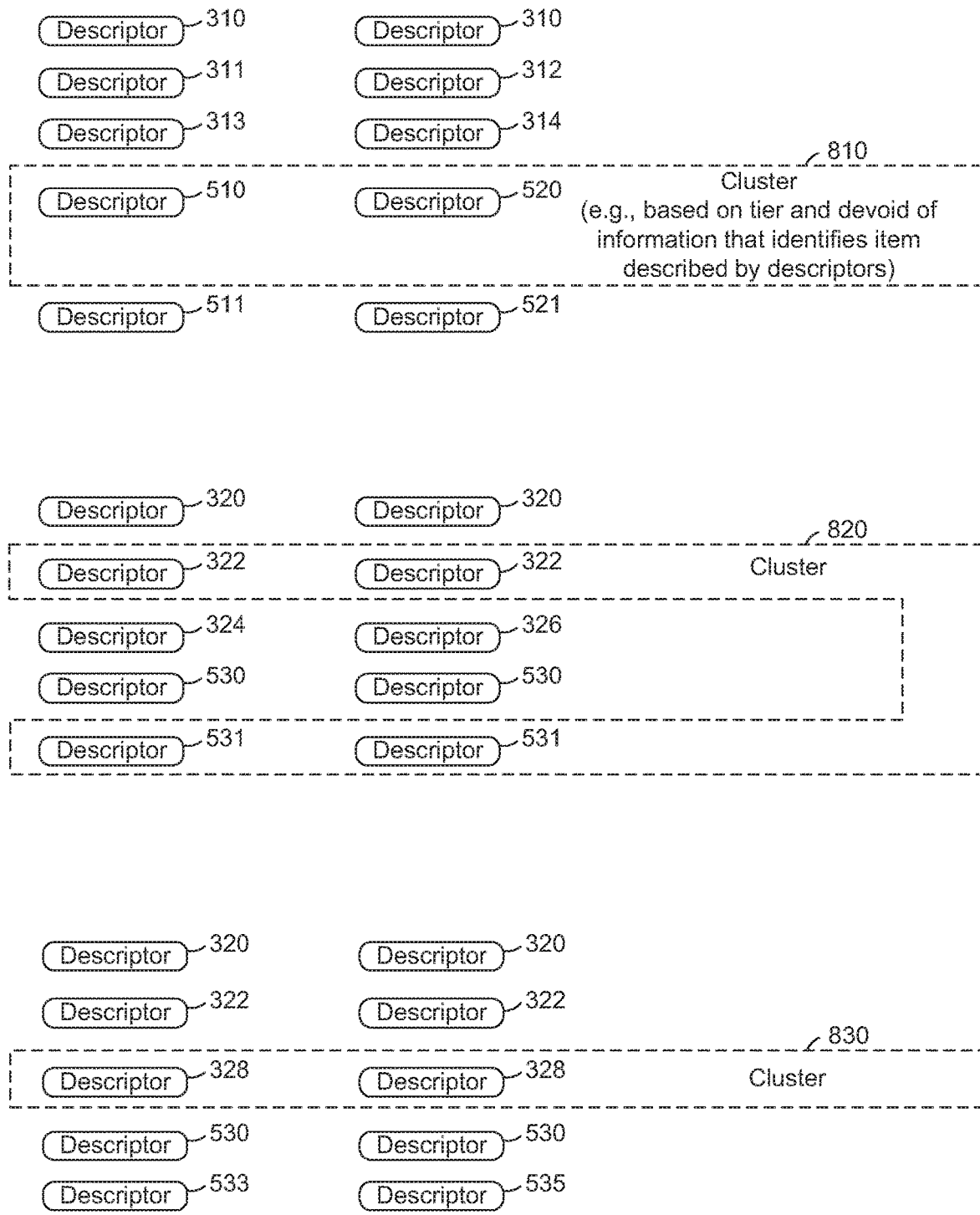
FIG. 8 is a conceptual diagram illustrating tiered descriptors of items being clustered into clusters of tiered descriptors, according to some example embodiments.

FIG. 8 is a conceptual diagram illustrating the descriptors 310-535 of the item 610-660 being clustered (e.g., by the cluster module 220 of the user profile machine 110) into clusters 810-830 of tiered descriptors (e.g., descriptors organized into tiers within one or more metadata models), according to some example embodiments. As shown, the descriptors 310, 311, 313, 510, and 511 that describe the item 610 may be grouped (e.g., by the user profile machine 110) with the descriptors 310, 312, 314, 520, and 521 that describe the item 620. The user profile machine 110 may generate the cluster 810, which includes the descriptors 510 and 520. In particular, the user profile machine 110 may generate the cluster 810 by determining that the descriptor 510 (e.g., a first descriptor) and the descriptor 520 (e.g., a second descriptor) are members of the cluster 810 based on the tier (e.g., "Tier 1") within which the descriptors 510 and 520 are represented within the metadata model 500. According to various example embodiments, the cluster 810 contains descriptors (e.g., descriptors 510 and 520) only, and therefore, the cluster 810 may be devoid of any information that identifies the item 610 or the item 620.

Similarly, the descriptors 320, 322, 324, 530, 531 that describe the item 630 may be grouped with the descriptors 320, 322, 326, 530, and 531 that describe the item 640. The user profile machine 110 may generate the cluster 820, which includes the descriptors 322 and 531. In particular, the user profile machine 110 may generate the cluster 820 by determining that the descriptor 322 (e.g., a first descriptor) and the descriptor 531 (e.g., a second descriptor) are members of the cluster 820 based on the descriptor 322 in metadata of the item 630 (e.g., a first descriptor) matching the descriptor 322 in metadata of the item 640 (e.g., a second descriptor), based on the descriptor 531 in metadata of the item 630 (e.g., a third descriptor) matching the descriptor 531 in metadata of the item 640 (e.g., a fourth descriptor), or based on both.

In some example embodiments, the user profile machine 110 uses an exact match (e.g., an identical match) between descriptors as a basis for such a determination. In certain example embodiments, the user profile machine 110 determines that the descriptors are similar (e.g., sufficiently similar within a threshold degree of similarity), and the similarity is a basis for determining that the descriptor 322, the descriptor 531, or both, are members of the cluster 820. For example, the user profile machine 110 may use a correlates matrix that indicates a degree of similarity between two non-identical descriptors, and a determination that two descriptors are similar may be based on accessing such a correlates matrix (e.g., from the database 115). The cluster 820 may contain only descriptors (e.g., descriptors 322 and 531), and hence, the cluster 820 may contain no information that identifies the items 630 and 640, which are described by the descriptors contained in the cluster 820.

As also shown in FIG. 8, the descriptors 320, 322, 328, 530, and 533 that describe the item 650 may be grouped with the descriptors 320, 322, 328, 530, and 535 that describe the item 660. The user profile machine 110 may generate the cluster 830, which includes the descriptor 328. In particular, the user profile machine 110 may generate the cluster 830 by determining that the descriptor 328 is a member of the cluster 830. Such a determination may be made based on the descriptor 328 in metadata that describes the item 650 (e.g., a first descriptor) being an exact match with the descriptor 328 in metadata that describes the item 660 (e.g., second descriptor). As noted above, in some example embodiments, the user profile machine 110 uses a similarity determination (e.g., based on a correlates matrix), instead of an exact match, to determine that two sufficiently similar descriptors are members of the cluster 830.

Figure 9:
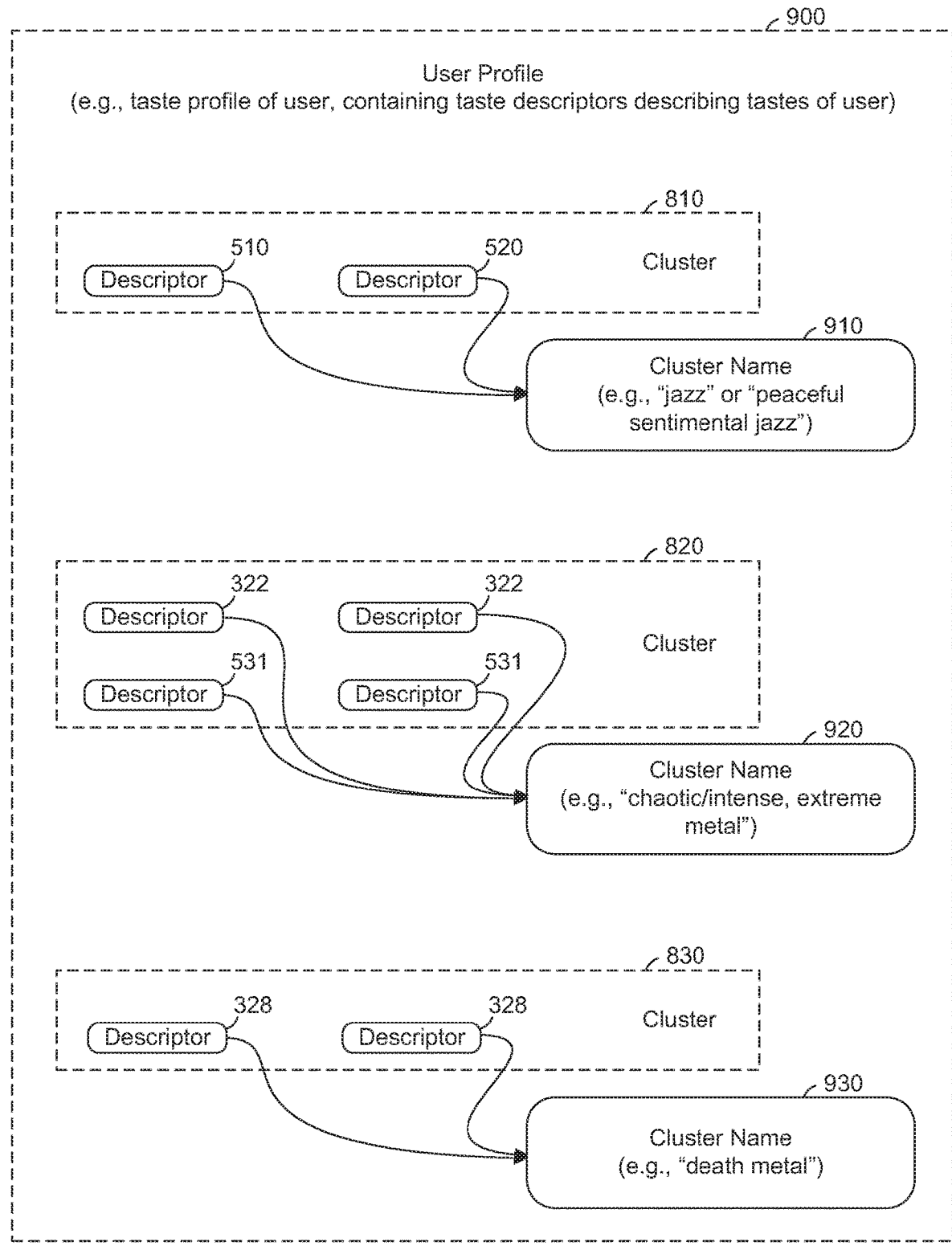
FIG. 9 is a block diagram of a user profile generated based on clusters of tiered descriptors, according to some example embodiments.
Figure 10:
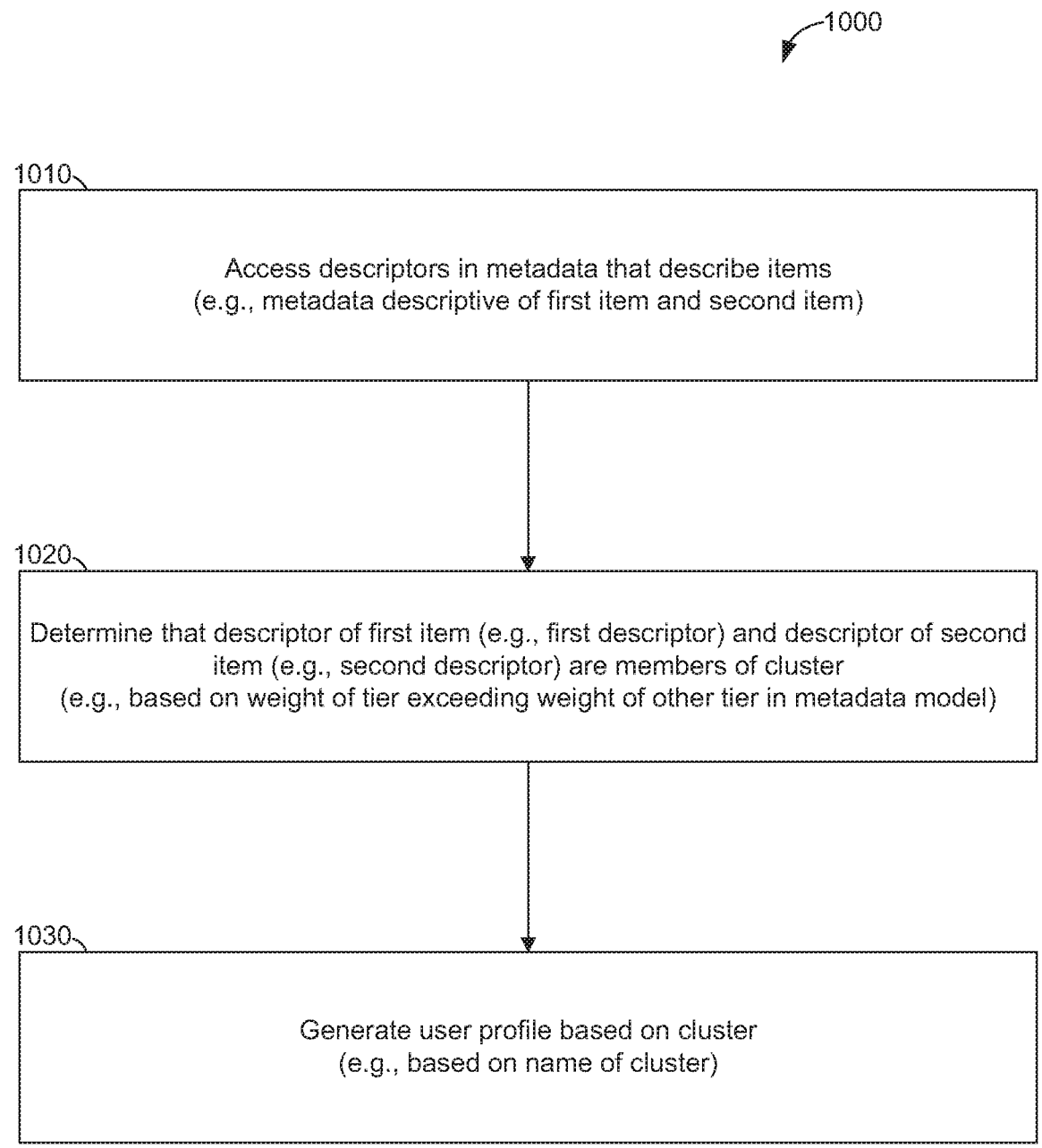
FIG. 10-15 are flowcharts illustrating operations of the user profile machine in performing a method of generating a user profile based on clustering tiered descriptors, according to some example embodiments.

FIG. 9 is a block diagram of a user profile 900 generated by the user profile machine 110, based on the clusters 810-830 of tiered descriptors, according to some example embodiments. The user profile 900 may function as a taste profile of the user 132, and the user profile 900 may contain one or more taste descriptors that describe one or more tastes of the user 132. According to various example embodiments, the user profile 900 also includes one or more weights of one or more clusters (e.g., clusters 810-830), example items that are representative of one or more clusters, media presentation statistics (e.g., number of times an item has been viewed or listened to), user-customized cluster names, or any suitable combination thereof.

As shown, the user profile 900 includes the cluster 810, which may include the descriptors 510 and 520. The user profile 900 is also shown as including the cluster 820, which may include the descriptors 322 and 531. The user profile 900 is further shown as including the cluster 830, which includes the descriptor 328.

FIG. 9 uses arrows to indicate that one or more cluster names 910-930 may be determined (e.g., generated or extracted) based on the clusters 810-830 and the descriptors contained therein. For example, the user profile machine 110 may determine the cluster name 910 for the cluster 810 based on the descriptor 510 (e.g., "peaceful") and the descriptor 520 (e.g., "sentimental") being in the cluster 810. The resulting cluster name 910 may therefore be "peaceful/sentimental" or "peaceful and sentimental." In some example embodiments, the cluster 810 also includes the descriptor 310 (e.g., "jazz") based on the descriptor 310 being present in metadata that describes both item 610 and item 620. In such example embodiments, the resulting cluster name 910 may therefore be "jazz" or "peaceful sentimental jazz."

As another example, the user profile machine 110 may determine the cluster name 920 for the cluster 820 based on the descriptor 322 (e.g., "extreme metal") and the descriptor 531 (e.g., "chaotic/intense") being in the cluster 820. In some example embodiments, the user profile machine 110 determines the cluster name 920 based on the descriptor 322 being descriptive of both the item 630 and the item 640. The resulting cluster name 920 may therefore be "chaotic/intense, extreme metal" or "chaotic, intense, and extreme metal."

As a further example, the user profile machine 110 may determine the cluster name 930 for the cluster 830 based on the descriptor 328 (e.g., "death metal") being in the cluster 830. The resulting cluster name 930 may therefore be "death metal" or "death metal music."

According to various example embodiments, one or more of the cluster names 910, 920, and 930 may be included in the user profile 900, referenced therein, or otherwise indicated within the user profile 900. Hence, one or more of the cluster names 910-930 may function as taste descriptors that describe tastes or penchants of the user 132 that corresponds to the user profile 900.

FIG. 10-15 are flowcharts illustrating operations of the user profile machine 110 in performing a method 1000 of generating the user profile 900 based on clustering tiered descriptors (e.g., descriptors 322, 328, 510, 520, and 531), according to some example embodiments. Operations in the method 1000 may be performed by the user profile machine 110, using modules described above with respect to FIG. 2. As shown, the method 1000 includes operations 1010, 1020, and 1030.

In operation 1010, the access module 210 accesses descriptors in metadata (e.g., metadata 615 of the item 610, plus metadata of the item 620) that describe a first item (e.g., item 610) and a second item (e.g., item 620). For example, the access module 210 may access the descriptors 310, 311, 313, 510, and 511 from the metadata 615 of the item 610, as well as the descriptors 310, 312, 314, 520, and 521 from metadata of the item 620. These accessed descriptors may include a first descriptor (e.g., descriptor 510) and a second descriptor (e.g., descriptor 520), which are organized (e.g., represented) in the same tier of a metadata model (e.g., "Tier 1" of the metadata model 500). As noted above, the first item and the second item may be specimens (e.g., members) of a collection of items (e.g., collection 700) that may belong to a user (e.g., user 132). For example, the collection may be a media library of the user 132, and the first and second items may be first and second media files within the media library.

In operation 1020, the cluster module 220 determines that the first and second descriptors are members of a cluster of tiered descriptors, and this determination may be made based on the common tier within which the first and second descriptors are represented in the metadata model. For example, the cluster module 220 may determine that the descriptor 510 and the descriptor 520 are members of the cluster 810, based on the descriptors 510 and 520 being in the top-level tier (e.g., "Tier 1") of the metadata model 500. In some example embodiments, the descriptors 510 and 520 are in a mid-level tier (e.g., "Tier 2") of the metadata model 500, and the members of the cluster 810 are determined based on the descriptors 510 and 520 being in that mid-level tier. In certain example embodiments, the descriptors 510 and 520 are in a bottom-level tier (e.g., "Tier 3") of the metadata model 500, and the members of the cluster 810 are determined based on the descriptors 510 and 520 being in the bottom-level tier.

According to various example embodiments, operation 1020 may be performed based on a weight of the tier within the metadata model that organizes the first and second descriptors. As noted above with respect to FIG. 3-4, the multiple tiers within the metadata model (e.g., metadata model 300) may be assigned various weights. Hence, performance of operation 1020 may include determining that the weight of "Tier 2" in the metadata model 300 (e.g., 0.5 or "medium") exceeds the weight of "Tier 1" in the metadata model 300 (e.g., 0.2 or "low"). Accordingly, the determining in operation 1020 that the first and second descriptors are members of the cluster may be based on the weight of "Tier 2" exceeding the weight of "Tier 1." This may have the effect of favoring one or more higher weighted tiers in determining which descriptors to use in operation 1020.

In operation 1030, the profile module 230 generates (e.g., creates or updates) the user profile 900 based on the cluster (e.g., cluster 810) of which the first and second descriptors are members. For example, the profile module 230 may generate the user profile 900 based on the cluster 810, which includes the descriptors 510 and 520. According to various example embodiments, operation 1030 generates the user profile 900 as a taste profile of the user 132.

Figure 11:
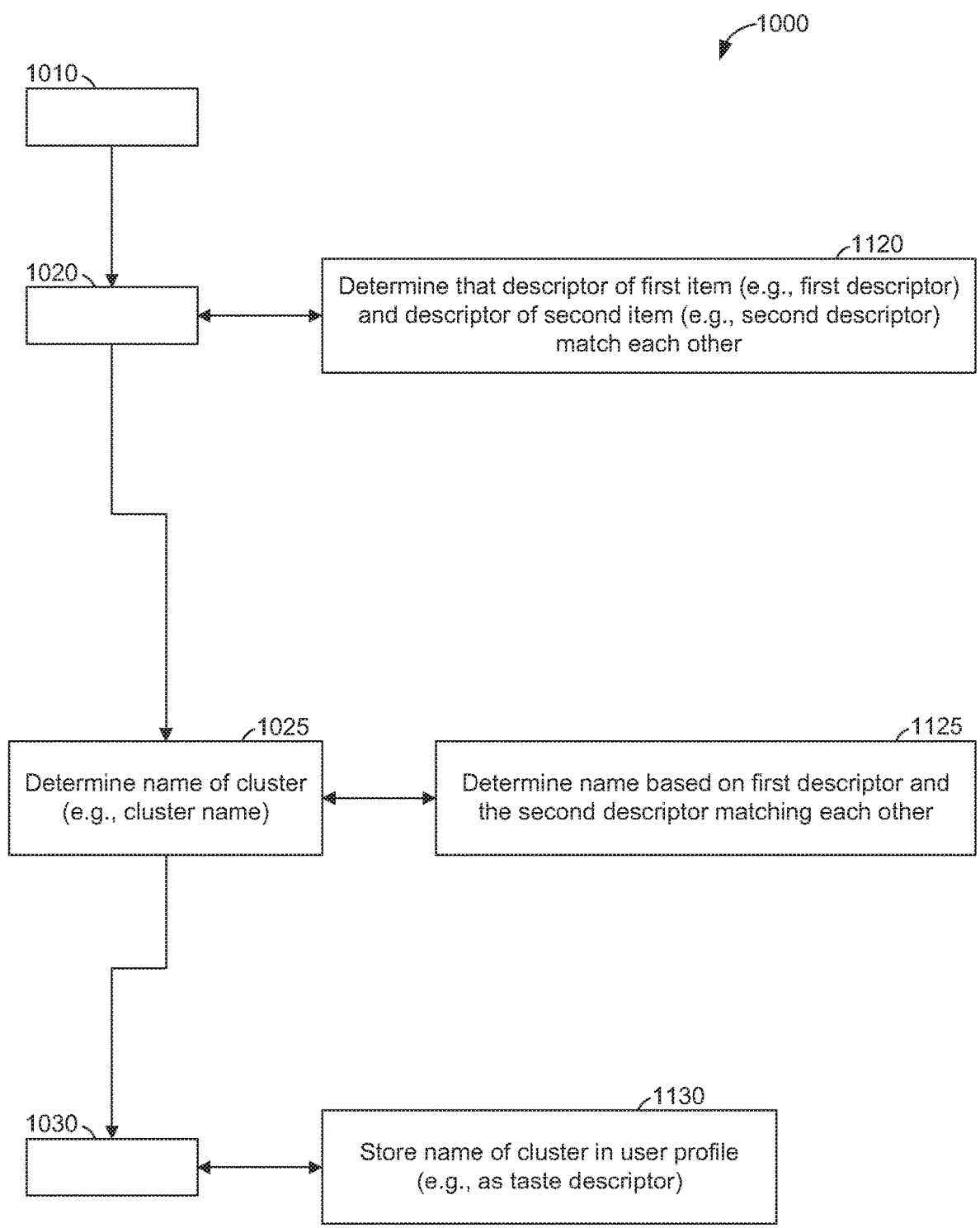

As shown in FIG. 11, the method 1000 may include one or more of operations 1025, 1120, 1125, and 1130. Operation 1120 may be performed as part (e.g., a precursor task, a subroutine, or a portion) of operation 1020, in which the cluster module 220 determines that the first and second descriptors (e.g., describing the first and second item) are grouped into the cluster (e.g., cluster 820) as members thereof. In operation 1120, the cluster module 220 determines that the first descriptor of the first item (e.g., descriptor 322 describing the item 630) and the second descriptor of the second item (e.g., descriptor 322 describing the item 640) match each other (e.g., identically). This determination may be used as a basis for performing operation 1020.

Operation 1025 may be performed prior to operation 1030, in which the profile module 230 generates the user profile 900. In some example embodiments, operation 1025 is performed as part of operation 1030. In operation 1025, the cluster module 220 determines a cluster name (e.g., cluster name 920) of the cluster discussed above with respect to operation 1020 (e.g., cluster 820). The cluster name may be determined using any one or more of the methodologies discussed above with respect to FIG. 9.

As shown with respect to operation 1125, the cluster module 220 may determine the cluster name (e.g., cluster name 920) based on the first descriptor of the first item (e.g., descriptor 322 describing the item 630) and the second descriptor of the second item (e.g., descriptor 322 describing the item 640) matching each other. Operation 1125 may be performed as part of operation 1025, in which the cluster module 220 determines the name (e.g., cluster name 920) of the cluster (e.g., cluster 820).

As shown with respect to operation 1130, the profile module 230 may store the name (e.g., cluster name 920) of the cluster (e.g., cluster 820) in the user profile 900. As noted above, a cluster name may be stored as a taste descriptor within the user profile 900, where the taste descriptor describes a taste (e.g., one or more tastes, preferences, or penchants) of the user 132 to which the user profile 900 corresponds. In some example embodiments, the profile module 230 stores the cluster name, the user profile 900, or both, in the database 115, for later use in providing one or more services to the user 132 (e.g., recommendations, advertising, or suggestions for items).

Figure 12:
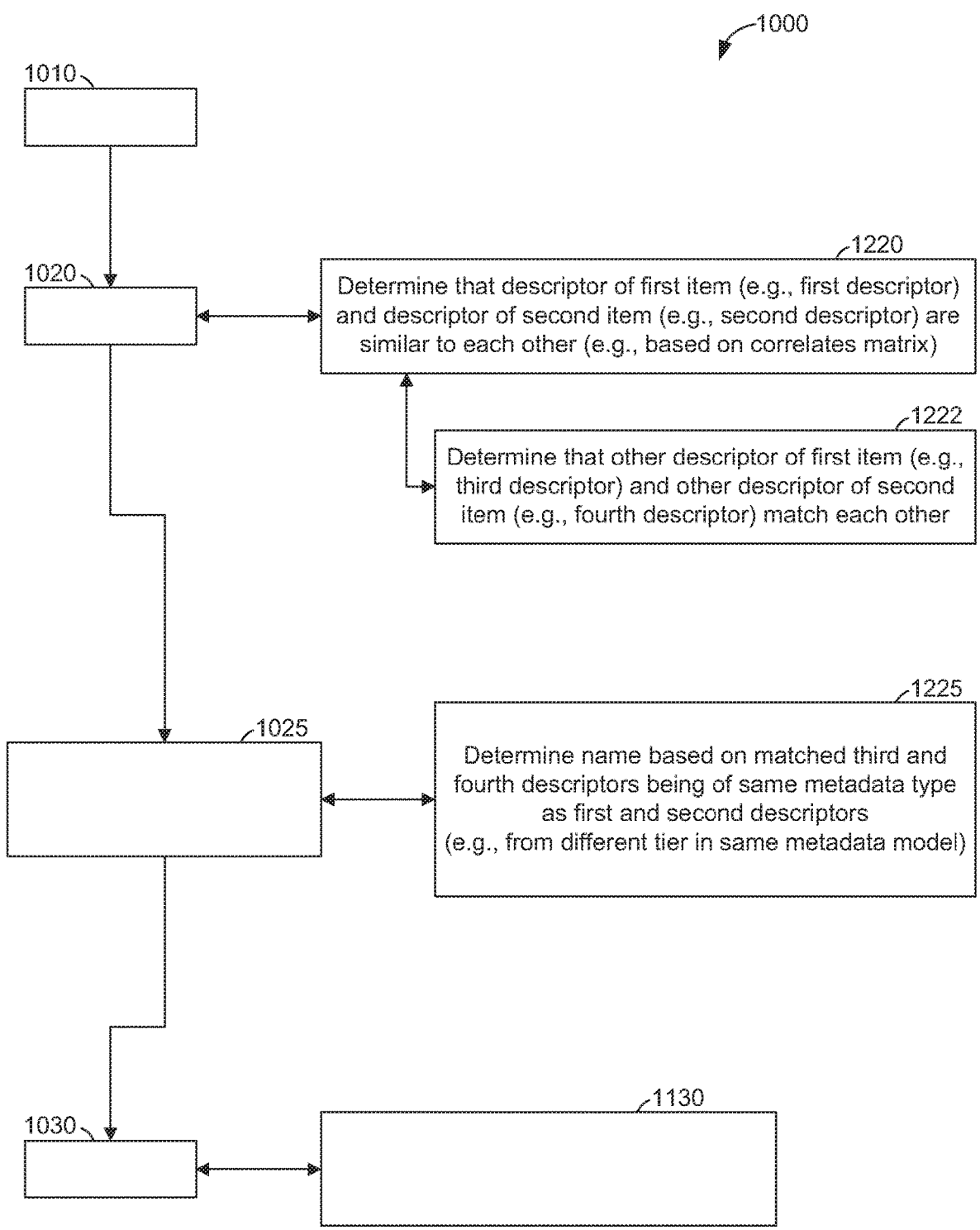

As shown in FIG. 12, the method 1000 may include one or more of operations 1220, 1222, and 1225. Operation 1220 may be performed as part of operation 1020, in which the cluster module 220 determines that the first and second descriptors (e.g., describing the first and second item) are grouped into the cluster (e.g., cluster 820) as members thereof. In operation 1220, the cluster module 220 determines that the first descriptor of the first item (e.g., descriptor 322 describing the item 630) and the second descriptor of the second item (e.g., descriptor 322 describing the item 640) are similar to each other. This similarity determination may be made based on a correlates matrix (e.g., a data structure that indicates a degree of similarity between two non-identical descriptors). According to various example embodiments, the similarity determination may be made based on a feature comparison, the distance metric, a probabilistic approach, or any suitable combination thereof. This determination may be used as a basis for performing operation 1020.

Operation 1222 may be performed as part of operation 1220. In operation 1222, the cluster module 220 determines that another descriptor of the first item (e.g., a third descriptor) and another descriptor of the second item (e.g., a fourth descriptor) match each other (e.g., identically). For example, with respect to the cluster 810, the cluster module 220 may determine that, although the descriptor 510 (e.g., "peaceful") and the descriptor 520 (e.g., "sentimental") are not identical, the descriptor 310 (e.g., "jazz") in the metadata 615 of the item 610 matches (e.g., identically) the descriptor 310 in metadata of the item 620. This determination may be used as a basis for performing operation 1020.

As shown with respect to operation 1225, the cluster module 220 may determine the cluster name (e.g., cluster name 910) of the cluster (e.g., cluster 810) based on the determination performed in operation 1222. That is, the matched descriptors (e.g., the third and fourth descriptors) in operation 1222 may be used as a basis for naming the cluster. In example embodiments with operation 1225, the cluster module 220 determines the cluster name based on the matched descriptors being of the same metadata type (e.g., "genre") as the first and second descriptors discussed above with respect to operation 1020. In other words, the matched descriptors (e.g., two instances of the descriptor 310) may be from the same metadata model (e.g., metadata model 300) as the first and second descriptors (e.g., descriptors 311 and 312 from the metadata model 300). However, the matched descriptors may be from a different tier (e.g., a further tier) within that metadata model. Operation 1225 may be performed as part of operation 1025.

Figure 13:
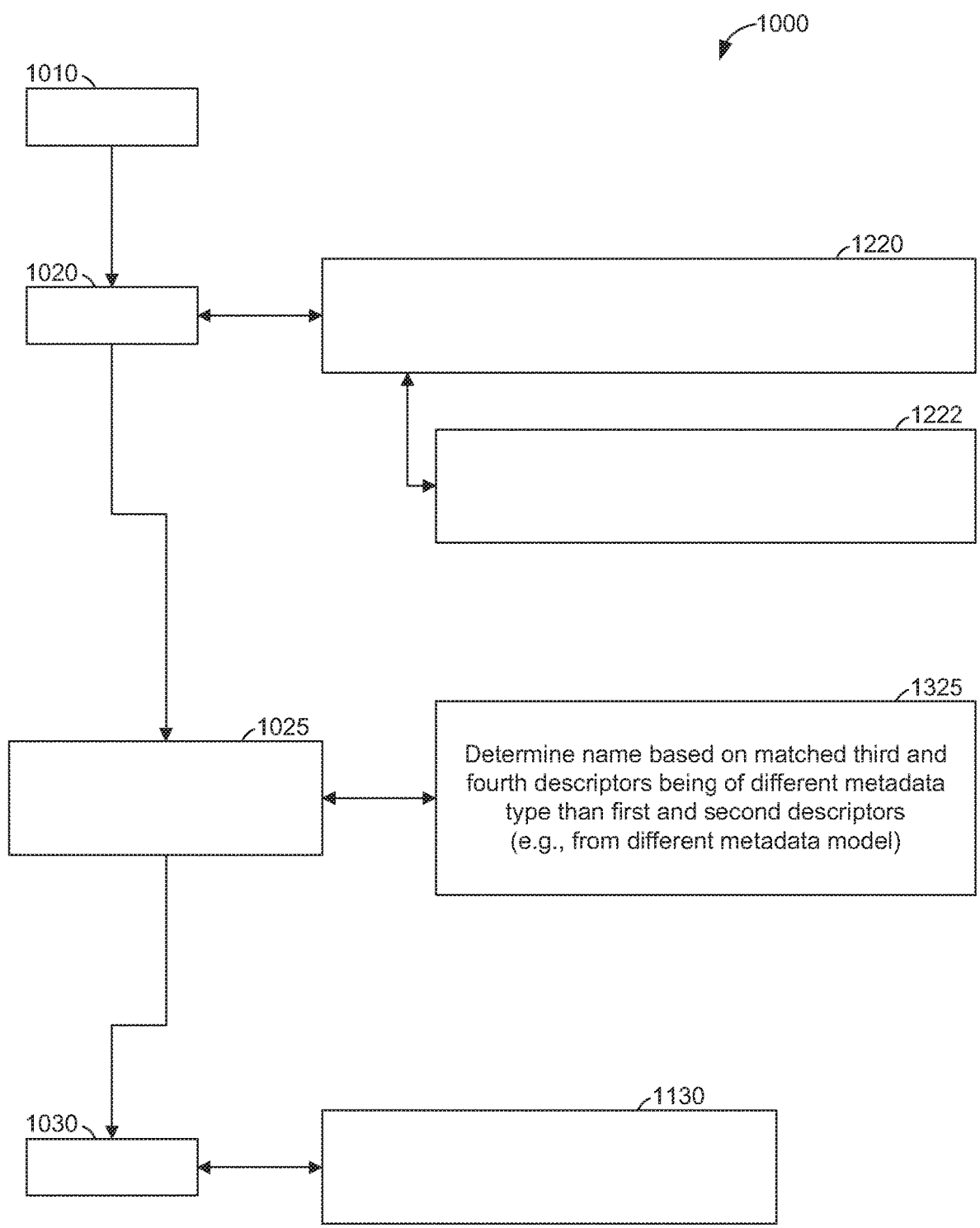

As shown in FIG. 13, the method 1000 include operation 1325, which may be performed as part of operation 1025, in which the cluster module 220 names the cluster. In operation 1325, the cluster module 220 determines the cluster name (e.g., cluster name 920) of the cluster (e.g., cluster 820) based on the determination performed in operation 1222. In example embodiments with operation 1325, the cluster module 220 determines a cluster name based on the matched descriptors being of a different metadata type (e.g., a further metadata type, such as "mood") then the first and second descriptors discussed above with operation 1020. In other words, the matched descriptors (e.g., two instances of the descriptor 322) may be from a different metadata model (e.g., metadata model 300) than the first and second descriptors (e.g., two instances of the descriptor 531 from the metadata model 500). Indeed, the matched descriptors (e.g., the third and fourth descriptors) may be absent from the metadata model (e.g., metadata model 500) that corresponds to the metadata type (e.g., "mood") of the first and second descriptors. Operation 1325 may be performed as part of operation 1025.

Figure 14:
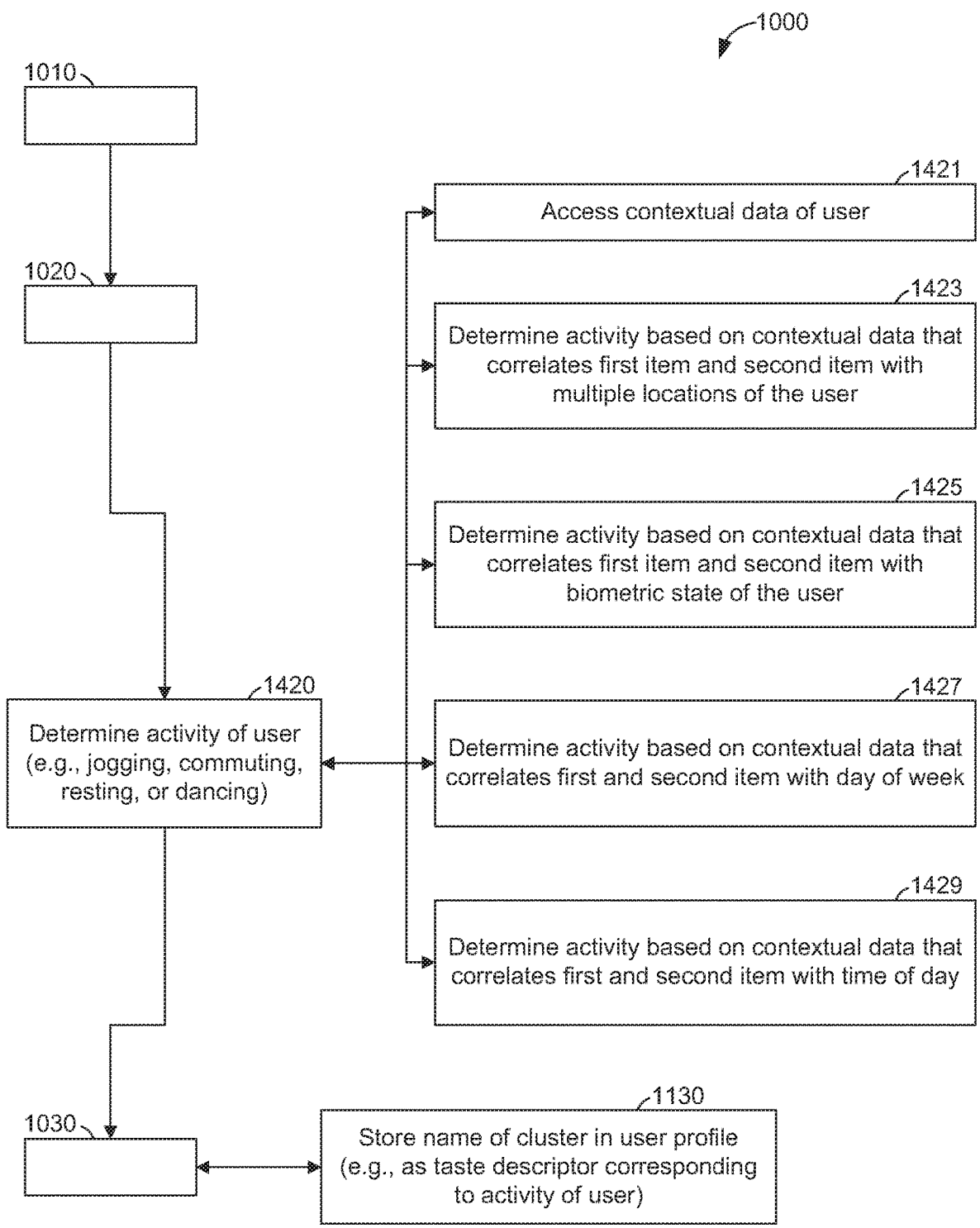

As shown in FIG. 14, the method 1000 may include one or more of operations 1420, 1421, 1423, 1425, 1427, and 1429. For convenience, also illustrated is operation 1130, which is discussed above with respect to FIG. 11.

Operation 1420 may be performed prior to operation 1030 or may be performed as part of operation 1030. In operation 1420, the correlation module 240 determines an activity of the user 132. Examples of such an activity include jogging, communing, resting, and dancing. The determined activity may be indicated in the user profile 900 generated in operation 1030. In particular, the activity may be correlated with one or more taste descriptors (e.g., cluster names stored as taste descriptors in the user profile 900). This may have the effect of indicating within the user profile 900 which taste descriptors correspond to which activities engaged in by the user 132.

One or more of operations 1421-1429 may be performed as part of operation 1420. In operation 1421, the context module 250 accesses contextual data of the user 132 and provides the contextual data to the correlation module 240. The contextual data describes a context within which the user 132 engages in the activity discussed above with respect to operation 1420. The contextual data may be accessed from the database 115, from the device 130 of the user 132, from location data (e.g., geo-location data) provided by the device 130 or the user 132, from biometric data (e.g., heart rate, blood pressure, temperature, or galvanic skin response) that corresponds to the user 132, from calendar data (e.g., appointments, meetings, holidays, or travel plans) of the user 132, from time data (e.g., time-of-day or day-of-week), or any suitable combination thereof. Accordingly, the contextual data may be processed by the context module 250 to determine one or more locations of the user 132, one or more biometric state of the user 132, or any suitable combination thereof.

In operation 1423, the correlation module 240 determines the activity based on contextual data that correlates the first and second items (e.g., items 630 and 640) with multiple locations of the user 132. For example, if the multiple locations indicate that, while enjoying the first and second items (e.g., songs), the user 132 is moving slowly (e.g., under 20 miles per hour) through his neighborhood streets along a route that forms a two-mile-long closed loop, the correlation module 240 may determine that the activity of the user 132 is "jogging." This may have the effect of associating one or more taste descriptors (e.g., taste descriptors applicable to the music) with the activity of "jogging" within the user profile 900 of the user 132. As another example, if the multiple locations indicate that the user 132 is moving quickly (e.g., over 20 miles per hour) between his neighborhood and a local business district along a route that the user 132 travels frequently during business hours, the correlation module 240 may determine that the activity of the user 132 is "commuting." This may have the effect of associating various taste descriptors with the activity of "commuting" within the user profile 900.

In operation 1425, the correlation module 240 determines the activity based on contextual data that correlates the first and second items (e.g., items 630 and 640) with a biometric state of the user 132. For example, if the biometric state of the user 132 is non-energetic (e.g., with a heart rate below 90 beats per minute) while accessing the first and second items (e.g., movies), the correlation module 240 may determine that the activity of the user 132 is "relaxing." This may have the effect of associating various taste descriptors in the user profile 900 with the activity of "relaxing." As another example, if the biometric state indicates that the user 132 is energetic (e.g., with a heart rate above 90 beats per minute), the correlation module 240 may determine that the activity of the user 132 is "exercising" or "dancing." This may have the effect of associating taste descriptors with the activity of "exercising" or "dancing" within the user profile 900. According to various example embodiments, these activities may be described by contextual descriptors (e.g., "exercising," "relaxing," or "dancing") that are represented in one or more metadata models of their own, and the systems and methods described herein may be used to generate a user profile that describes the user's taste for activities.

In operation 1427, the correlation module 240 determines the activity based on contextual data that correlates the first and second items (e.g., item 630 and 640) with time data that indicates a day of the week. For example, if the time data indicates that the user 132 partakes of the first and second items (e.g., foods) on Sundays late in the morning (e.g., at 10:30 AM), the correlation module 240 may determine that the activity is "Sunday brunch." This may have the effect of associating taste descriptors in the user profile 900 with the activity of "Sunday brunch."

In operation 1429, the correlation module 240 determines the activity based on contextual data that correlates the first and second items (e.g., item 630 and 640) with time data that indicates the time of day. For example, if the time data indicates that the user 132 presents the first and second items (e.g., songs) every morning at 7 AM, the correlation module 240 may determine the activity is "waking up." This may have the effect of associating taste descriptors in the user profile 900 with the activity of "waking up."

Figure 15:
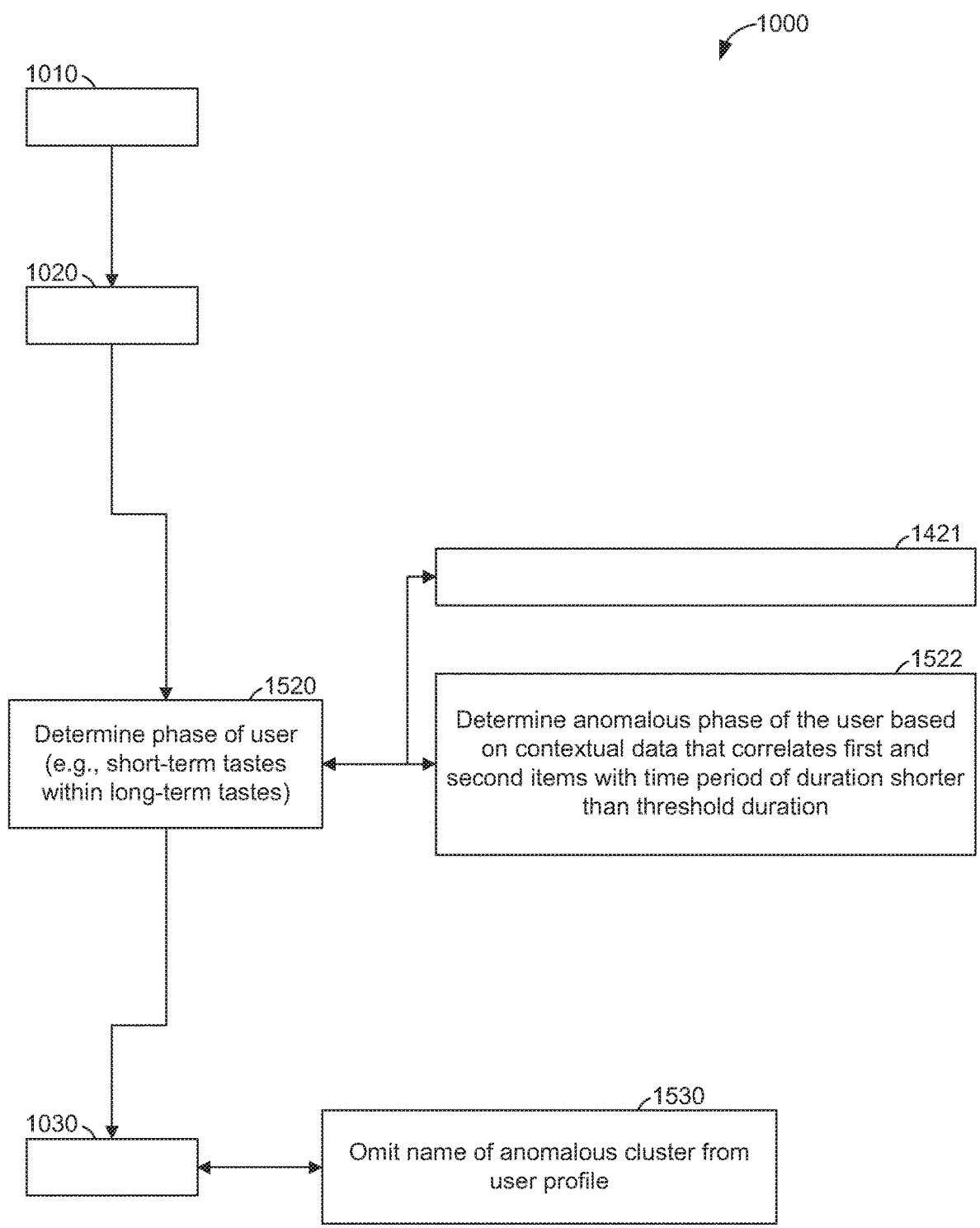

As shown in FIG. 15, the method 1000 may include one or more of operations 1520, 1522, and 1530. For convenience, also illustrated is operation 1421, which is discussed above with respect to FIG. 14.

Operation 1520 may be performed prior to operation 1030 or may be performed as part of operation 1030. The phase module 260 may monitor one or more data streams for events that indicate how frequently the user 132 is associated with the first and second items (e.g., by presenting, enjoying, retrieving, or otherwise accessing the first and second items). In operation 1520, the phase module 260 determines that the user 132 is experiencing an anomalous phase. That is, the phase module 260 may determine that accessing the first and second items is uncharacteristic of the user 132 (e.g., compared to long-term behavior of the user 132). Operation 1520 may be based on the contextual data accessed in operation 1421, and operation 1520 may involve a comparison of short-term tastes of the user 132 with long-term tastes of the user 132, as indicated by taste descriptors and time data. This may have the effect of detecting an experimental phase in which the user 132 experiments with new items or a period of time in which the user 132 was under a particular influence temporarily (e.g., entertaining visitors).

Operation 1522 may be performed as part of operation 1520 and may be performed based on the contextual data accessed in operation 1421. In operation 1522, the phase module 260 determines the anomalous phase of the user based on contextual data that correlates the first and second items (e.g., item 650 and 660) with a time period that has a duration shorter than a threshold duration (e.g., shorter than one month). For example, if the first and second items were accessed by the user 132 within a single day and never accessed again afterward, the phase module 260 may determine that the single day represents the anomalous phase of the user 132 determined in operation 1520.

Operation 1530 may be performed as part of operation 1030, in which the profile module 230 generates the user profile 900 of the user 132. In operation 1530, the profile module 230 omits the name (e.g., cluster name 930) of the cluster (e.g., cluster 830) from the user profile 900. This omission of the cluster name may be based on the determination in operation 1520 that the user 132 experienced the anomalous phase. This may have the effect of avoiding inclusion of anomalous taste profiles in the user profile 900 of the user 132.

According to various example embodiments, one or more of the methodologies described herein may facilitate generation of a user profile based on clustering tiered descriptors. Moreover, one or more of the methodologies described herein may facilitate creation and maintenance of a detailed taste profile that accurately represents the tastes of a user. Hence, one or more the methodologies described herein may facilitate provision of one or more recommendation services (e.g., personalized media channels or personalized user interfaces), suggestion services, advertisements, or merchandising services to one or more users, as well as support social networking features that facilitates discussion, sharing, or discovery of items between or among multiple users. In addition to items, users (e.g., friends) brands, and concepts may similarly be shared, discovered, or discussed, according to one or more of the methodologies described herein.

When these effects are considered in aggregate, one or more of the methodologies described herein may obviate a need for certain efforts or resources that otherwise would be involved in generating and using user profiles based on clustering tiered descriptors. Efforts expended obtaining detailed and accurate taste profiles of users may be reduced by one or more of the methodologies described herein. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Figure 16:
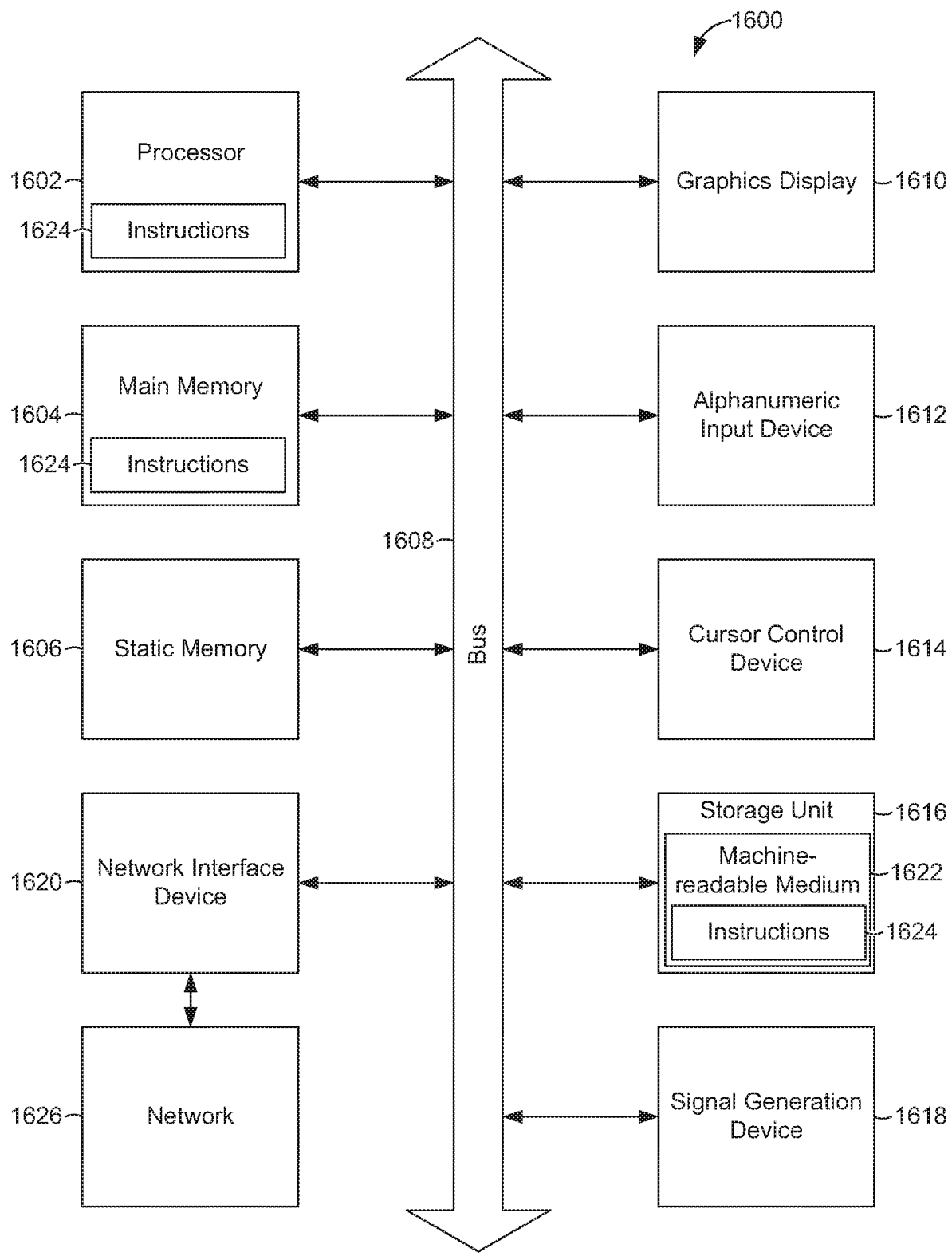
FIG. 16 is a block diagram illustrating components of a machine, according to some example embodiments, able to read instructions from a machine-readable medium and perform any one or more of the methodologies discussed herein.

FIG. 16 is a block diagram illustrating components of a machine 1600, according to some example embodiments, able to read instructions from a machine-readable medium (e.g., a machine-readable storage medium) and perform any one or more of the methodologies discussed herein, in whole or in part. Specifically, FIG. 16 shows a diagrammatic representation of the machine 1600 in the example form of a computer system and within which instructions 1624 (e.g., software, a program, an application, an applet, an app, or other executable code) for causing the machine 1600 to perform any one or more of the methodologies discussed herein may be executed. In alternative embodiments, the machine 1600 operates as a standalone device or may be connected (e.g., networked) to other machines. In a networked deployment, the machine 1600 may operate in the capacity of a server machine or a client machine in a server-client network environment, or as a peer machine in a peer-to-peer (or distributed) network environment. The machine 1600 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1624, sequentially or otherwise, that specify actions to be taken by that machine. Further, while only a single machine is illustrated, the term "machine" shall also be taken to include a collection of machines that individually or jointly execute the instructions 1624 to perform any one or more of the methodologies discussed herein.

The machine 1600 includes a processor 1602 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1604, and a static memory 1606, which are configured to communicate with each other via a bus 1608. The machine 1600 may further include a graphics display 1610 (e.g., a plasma display panel (PDP), a light emitting diode (LED) display, a liquid crystal display (LCD), a projector, or a cathode ray tube (CRT)). The machine 1600 may also include an alphanumeric input device 1612 (e.g., a keyboard), a cursor control device 1614 (e.g., a mouse, a touchpad, a trackball, a joystick, a motion sensor, or other pointing instrument), a storage unit 1616, a signal generation device 1618 (e.g., a speaker), and a network interface device 1620.

The storage unit 1616 includes a machine-readable medium 1622 on which is stored the instructions 1624 embodying any one or more of the methodologies or functions described herein. The instructions 1624 may also reside, completely or at least partially, within the main memory 1604, within the processor 1602 (e.g., within the processor's cache memory), or both, during execution thereof by the machine 1600. Accordingly, the main memory 1604 and the processor 1602 may be considered as machine-readable media. The instructions 1624 may be transmitted or received over a network 1626 (e.g., network 190) via the network interface device 1620.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1622 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., machine 1600), such that the instructions, when executed by one or more processors of the machine (e.g., processor 1602), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following enumerated descriptions define various example embodiments of methods and systems (e.g., apparatus) discussed herein:

1. A method comprising:
accessing descriptors in metadata descriptive of a first item and of a second item, the descriptors and metadata having a metadata type that corresponds to a metadata model that organizes the descriptors into multiple tiers of the metadata model, the descriptors including a first descriptor of the first item and a second descriptor of the second item, the first descriptor and the second descriptor being represented in a tier among the multiple tiers of the metadata model;
determining that the first descriptor and the second descriptor are members of a cluster of descriptors based on the tier within which the first descriptor and the second descriptor are represented in the metadata model, the determining being performed by a processor of a machine; and
generating a user profile based on the cluster of descriptors of which the first descriptor and the second descriptor are members.

2. The method of description 1, wherein:
the first item and the second item are specimens of a collection of items that belong to a user.

3. The method of description 2, wherein:
the collection of items is a media library of the user;
the first item is a first media file in the media library of the user; and
the second item is a second media file in the media library of the user.

4. The method of any of description 1-3, wherein:
the metadata type of the metadata model is selected from a group consisting of: genre, mood, origin, era, tempo, and artist type.

5. The method of any of descriptions 1-4, wherein:
the metadata model organizes the descriptors into a hierarchy of descriptors that includes the multiple tiers of the metadata model.

6. The method of any of descriptions 1-5, wherein:
the determining that the first descriptor and the second descriptors are members of the cluster includes determining that the first descriptor and the second descriptor match each other.

7. The method of description 6 further comprising:
determining a name of the cluster based on the first descriptor being determined to match the second descriptor, and wherein
the generating of the user profile includes storing the name of the cluster within the user profile as a taste descriptor that describes a taste of a user that corresponds to the user profile.

8. The method of any of descriptions 1-5, wherein:
the determining that the first descriptor and the second descriptors are members of the cluster includes determining that the first descriptor and the second descriptor are similar to each other.

9. The method of description 8 further comprising:
determining a name of the cluster based on a third descriptor of the first item being determined to match a fourth descriptor of the second item; and wherein
the generating of the user profile includes storing the name of the cluster within the user profile as a taste descriptor that describes a taste of a user that corresponds to the user profile.

10. The method of description 9, wherein:
the third descriptor and the fourth descriptor have the metadata type of the first descriptor and the second descriptor; and
the third descriptor and the fourth descriptor are represented in a further tier among the multiple tiers of the metadata model.

11. The method of description 9, wherein:
the third descriptor and the fourth descriptor have a further metadata type that is distinct from the metadata type of the first descriptor and the second descriptor; and
the third descriptor and the fourth descriptor are absent from the metadata model and represented in a further metadata model that corresponds to the further metadata type.

12. The method of any of descriptions 1-11, wherein:
the metadata model indicates that the tier within which the first descriptor and the second descriptor are represented has a weight that exceeds a further weight of a further tier among the multiple tiers of the metadata model; and
the determining that the first descriptor and the second descriptor are members of the cluster is based on the weight of the tier exceeding the further weight of the further tier.

13. The method of description 12, wherein:
the metadata model includes a hierarchy of the multiple tiers in which a top tier is weighted lower than the weight of the tier in which the first descriptor and the second descriptor are represented.

14. The method of any of descriptions 1-13 further comprising:
determining an activity of the user based on contextual data that correlates the first item and the second item with multiple locations of a user and a biometric state of the user; and wherein
the generating of the user profile includes storing a name of the cluster within the user profile as corresponding to the activity determined based on the multiple locations and the biometric state of the user.

15. The method of any of descriptions 1-14 further comprising:
determining an activity of the user based on contextual data that correlates the first item and the second item with a day of week and a time of day; and wherein
the generating of the user profile includes storing a name of the cluster within the user profile as corresponding to the activity determined based on the day of week and the time of day.

16. The method of any of descriptions 1-15 further comprising:
determining an anomalous phase of the user based on contextual data that correlates the first item and the second item with a time period that has a duration shorter than a threshold duration; and wherein
the generating of the user profile includes omitting a name of the cluster from the user profile.

17. A non-transitory machine-readable storage medium comprising
instructions that, when executed by one or more processors of a machine, cause the machine to perform operations comprising:
accessing descriptors in metadata descriptive of a first item and of a second item, the descriptors and metadata having a metadata type that corresponds to a metadata model that organizes the descriptors into multiple tiers of the metadata model, the descriptors including a first descriptor of the first item and a second descriptor of the second item, the first descriptor and the second descriptor being represented in a tier among the multiple tiers of the metadata model;
determining that the first descriptor and the second descriptor are members of a cluster of descriptors based on the tier within which the first descriptor and the second descriptor are represented in the metadata model, the determining being performed by the one or more processors of the machine; and
generating a user profile based on the cluster of descriptors of which the first descriptor and the second descriptor are members.

18. The non-transitory machine-readable storage medium of description 17, wherein:
the metadata model indicates that the tier within which the first descriptor and the second descriptor are represented has a weight that exceeds a further weight of a further tier among the multiple tiers of the metadata model; and
the determining that the first descriptor and the second descriptor are members of the cluster is based on the weight of the tier exceeding the further weight of the further tier.

19. A system comprising:
an access module configured to access descriptors in metadata descriptive of a first item and of a second item, the descriptors and metadata having a metadata type that corresponds to a metadata model that organizes the descriptors into multiple tiers of the metadata model, the descriptors including a first descriptor of the first item and a second descriptor of the second item, the first descriptor and the second descriptor being represented in a tier among the multiple tiers of the metadata model;
a processor configured by a cluster module to determine that the first descriptor and the second descriptor are members of a cluster of descriptors based on the tier within which the first descriptor and the second descriptor are represented in the metadata model; and a profile module configured to generate a user profile based on the cluster of descriptors of which the first descriptor and the second descriptor are members.

20. The system of description 19, wherein:
the metadata model indicates that the tier within which the first descriptor and the second descriptor are represented has a weight that exceeds a further weight of a further tier among the multiple tiers of the metadata model; and
the cluster module configures the processor to determine that the first descriptor and the second descriptor are members of the cluster based on the weight of the tier exceeding the further weight of the further tier.

What is claimed is:

1. An apparatus comprising:
memory; and
at least one processor to execute instructions to at least:
  group descriptors into a cluster of descriptors based on an association between the descriptors and each of a first item and a second item;
  access biometric data of a user via a user device;
  determine a first activity in which the user is engaged based on contextual data that correlates the cluster of descriptors with the biometric data of the user received from the user device via the network;
  determine whether the first activity represents an anomalous phase of the user based on a time period of the first activity having a duration shorter than a threshold duration;
  in response to the determining that the first activity does not represent the anomalous phase of the user, generate a user profile based on the first activity of the user and the cluster of descriptors;
  in response to the determining that the first activity represents the anomalous phase of the user, omit a name of the cluster descriptors from the user profile to reduce size of the profile; and
  in response to a second activity of the user matching the first activity associated with the cluster of descriptors within the user profile, generate a recommendation including a third item based on the user profile.

2. The apparatus of claim 1, wherein:
the first item and the second item are included in a collection of items associated with the user;
the collection of items is a media library of the user;
the first item is a first media file in the media library of the user; and
the second item is a second media file in the media library of the user.

3. The apparatus of claim 1, wherein the at least one processor is to:
  determine the first activity of the user based on contextual data that correlates the first item and the second item with a first and second location of the user, the locations received from the user device via the network; and
  store a name of the group within the user profile as corresponding to the first activity determined based on the first and second location of the user.

4. The apparatus of claim 3, wherein the at least one processor is to:
  when the first location is associated with a neighborhood associated with the user and the second location is associated with a business district, determine the first activity of the user is commuting; and
  store the name of the group within the user profile as corresponding to commuting.

5. The apparatus of claim 1, wherein the at least one processor is to:
  determine the first activity of the user based on contextual data that correlates the first item and the second item with a day of week and a time of day; and
  store a name of the group within the user profile as corresponding to the first activity determined based on the day of week and the time of day.

6. The apparatus of claim 1, wherein the at least one processor is to:
  determine the first activity of the user based on contextual data that correlates the first item and the second item with an appointment of the user, the appointment retrieved from calendar data associated with the user; and
  store a name of the group within the user profile as corresponding to the first activity determined based on the appointment.

7. A non-transitory machine-readable storage medium comprising instructions that, when executed, cause at least one processor to at least:
  group descriptors into a cluster of descriptors based on an association between the descriptors and each of a first item and a second item;
  access, via a user device communicatively coupled to the machine via a network, biometric data of a user;
  determine a first activity in which the user is engaged based on contextual data that correlates the cluster of descriptors with the biometric data of the user received from the user device via the network;
  determine whether the first activity represents an anomalous phase of the user based on a time period of the first activity having a duration shorter than a threshold duration;
  in response to determining that the first activity does not represent the anomalous phase of the user, generate a user profile based on the first activity of the user and the cluster of descriptors;
  in response to determining that the first activity represents the anomalous phase of the user, reduce, by executing an instruction with a processor, the size of user profile by omitting a name of the cluster of descriptors from the user profile; and
  when a second activity of the user matches the first activity associated with the cluster of descriptors within the user profile, generate a recommendation including a third item based on the user profile.

8. The non-transitory machine-readable storage medium of claim 7, wherein:
the first item and the second item are specimens of a collection of items that belong to the user;
the collection of items is a media library of the user;
the first item is a first media file in the media library of the user; and
the second item is a second media file in the media library of the user.

9. The non-transitory machine-readable storage medium of claim 7, wherein the instructions, when executed, further cause the at least one processor to:
  determine the first activity of the user based on contextual data that correlates the first item and the second item with a day of week and a time of day; and
  store a name of the group within the user profile as corresponding to the first activity determined based on the day of week and the time of day.

10. The non-transitory machine-readable storage medium of claim 7, wherein the instructions, when executed, further cause the at least one processor to:

determine the first activity of the user based on contextual data that correlates the first item and the second item with a first and second location of the user, the locations received from the user device via the network; and store a name of the group within the user profile as corresponding to the first activity determined based on the first and second location of the user.

11. The non-transitory machine-readable storage medium of claim 7, wherein the instructions, when executed, further cause the at least one processor to:

determine the first activity of the user based on contextual data that correlates the first item and the second item with an appointment of the user, the appointment retrieved from calendar data associated with the user; and store a name of the group within the user profile as corresponding to the first activity determined based on the appointment.

12. A method comprising:

grouping, by executing an instruction with a processor, descriptors into a cluster of descriptors based on an association between the descriptors and each of a first item and a second item;

accessing, via a user device communicatively coupled to the processor via a network, biometric data of a user;

determining, by executing an instruction the processor, a first activity in which the user is engaged based on contextual data that correlates the cluster of descriptors with the biometric data of the user received from the user device via the network, determining whether the first activity represents an anomalous phase of the user based on a time period of the first activity having a duration shorter than a threshold duration;

in response to determining that the first activity does not represent the anomalous phase of the user, generating, by executing an instruction the processor, a user profile based on the first activity of the user and the cluster of descriptors;

in response to determining that the first activity represents the anomalous phase of the user, reducing, by executing an instruction with a processor, the size of user profile by omitting a name of the cluster of descriptors from the user profile; and generating, by executing an instruction the processor, in response to a second activity of the user matching the first activity associated with the cluster of descriptors within the user profile, a recommendation including a third item based on the user profile.

13. The method of claim 12, wherein:

the first item and the second item are included in a collection of items associated with the user;

the collection of items is a media library of the user;

the first item is a first media file in the media library of the user; and the second item is a second media file in the media library of the user.

14. The method of claim 12, further including:

determining the first activity of the user based on contextual data that correlates the first item and the second item with a first and second location of the user, the locations received from the user device via the network; and storing a name of the group within the user profile as corresponding to the first activity determined based on the first and second location of the user.

15. The method of claim 14, further including:

determining the first activity of the user is commuting in response to determining the first location is associated with a neighborhood associated with the user and the second location is associated with a business district; and storing the name of the group within the user profile as corresponding to commuting.

16. The method of claim 12, further including:

determining the first activity of the user based on contextual data that correlates the first item and the second item with a day of week and a time of day; and storing a name of the group within the user profile as corresponding to the first activity determined based on the day of week and the time of day.

17. The method of claim 12, further including:

determining the first activity of the user based on contextual data that correlates the first item and the second item with an appointment of the user, the appointment retrieved from calendar data associated with the user; and storing a name of the group within the user profile as corresponding to the first activity determined based on the appointment.

* * * * *